(12) United States Patent
Cronin

(10) Patent No.: US 11,280,654 B2
(45) Date of Patent: Mar. 22, 2022

(54) RECIPROCATING PISTON PUMP

(71) Applicant: Quanta IQ, Inc., Irvine, CA (US)

(72) Inventor: William Clark Cronin, Irvine, CA (US)

(73) Assignee: Quanta IQ, Inc., Irvine, CA (US)

( * ) Notice: Subject to any disclaimer, the term of this patent is extended or adjusted under 35 U.S.C. 154(b) by 190 days.

(21) Appl. No.: 16/826,163

(22) Filed: Mar. 20, 2020

(65) Prior Publication Data
US 2021/0293234 A1  Sep. 23, 2021

(51) Int. Cl.
*G01F 3/16* (2006.01)
*F04B 53/16* (2006.01)
*F04B 5/02* (2006.01)

(52) U.S. Cl.
CPC ............ *G01F 3/16* (2013.01); *F04B 5/02* (2013.01); *F04B 53/16* (2013.01); *F04B 2201/0201* (2013.01)

(58) Field of Classification Search
CPC ..... G01F 3/02; G01F 3/04; G01F 3/14; G01F 3/16; G01F 3/18; F04B 5/02; F04B 53/16; F04B 2201/0201
See application file for complete search history.

(56) References Cited

U.S. PATENT DOCUMENTS

| | | |
|---|---|---|
| 354,613 A | 12/1886 | Toense |
| 445,070 A | 1/1891 | J. A. et al. |
| 1,355,208 A | 10/1920 | Bassler |
| 1,470,684 A | 10/1923 | Cade |
| 1,505,306 A | 8/1924 | Bassler |
| 1,637,850 A | 8/1927 | James et al. |
| 1,841,568 A | 1/1932 | Bradley |
| 1,905,549 A | 4/1933 | Bassler |
| 3,107,527 A | 10/1963 | Hippen et al. |
| 3,459,041 A * | 8/1969 | Hippen ............ G01F 3/16 73/239 |
| 3,919,887 A | 11/1975 | Binder |
| 4,043,198 A * | 8/1977 | Stillwell ............ G01F 3/16 73/242 |
| 4,167,194 A | 9/1979 | Matsuda |
| 4,542,651 A | 9/1985 | Sanada |

(Continued)

FOREIGN PATENT DOCUMENTS

| | | |
|---|---|---|
| AT | 100972 B | 9/1925 |
| CN | 85205112 U | 10/1986 |

(Continued)

*Primary Examiner* — Justin N Olamit
(74) *Attorney, Agent, or Firm* — Fish IP Law, LLP; Joseph A. Andelin

(57) ABSTRACT

A reciprocating piston pump assembly comprises a cylinder housing with two internal chambers separated by a piston. The piston is coupled with a pushrod that reciprocates back and forth between two positions. The piston's position is tracked to measure the volume of fluid passing through the pump assembly. The pump assembly has two inlets, two outlets, two inlet passages, and two outlet passages. A first valve is positioned on the pushrod at a junction between the first inlet passage and first outlet passage. A second valve is positioned on the pushrod at a junction between the second inlet passage and second outlet passage. The pushrod can be positioned in a neutral position to simultaneously close both valves.

19 Claims, 21 Drawing Sheets

(56) References Cited

U.S. PATENT DOCUMENTS

| | | | |
|---|---|---|---|
| 5,758,563 A * | 6/1998 | Robinson | ................ F01L 31/02 |
| | | | 91/346 |
| 7,344,127 B2 | 3/2008 | Beck | |
| 8,164,927 B2 | 4/2012 | Wehage | |
| 8,875,586 B2 | 11/2014 | Morrell | |
| 2007/0122295 A1* | 5/2007 | Divisi | ....................... G01F 3/18 |
| | | | 417/392 |

FOREIGN PATENT DOCUMENTS

| | | |
|---|---|---|
| DE | 100972 C | 5/1898 |
| DE | 851413 C | 10/1952 |
| GB | 178549 A | 4/1922 |
| GB | 215695 A | 5/1924 |
| GB | 698685 A | 10/1953 |
| JP | S5237086 A | 3/1977 |
| JP | S57518 A | 1/1982 |
| JP | S6051653 A | 3/1985 |

* cited by examiner

RECIPROCATING PISTON PUMP

FIELD OF INVENTION

The field of the invention is reciprocating piston pumps.

BACKGROUND

The following description includes information that may be useful in understanding the present invention. It is not an admission that any of the information provided herein is prior art or relevant to the presently claimed invention, or that any publication specifically or implicitly referenced is prior art.

A dosing pump (or metering pump) is a small, positive displacement pump. It is designed to produce a very specific rate of flow of a chemical or other fluid, into another larger body of fluid. This process generally involves drawing a specific volume of fluid into a cavity inside the dosing pump and injecting it into the pipe or tank being dosed.

Dosing pump size is typically small and is powered by an electric motor or pneumatic actuator. Control of the pump is generally through an external control system, or an internal controller. These options allow the user to alter rate of flow, set automatic functions and program alarms/warnings for low/dry feed tanks and degassing.

Applications for dosing pumps can generally be found in agriculture, water treatment, petrochemical, pharmaceutical and other industries.

Most dosing pumps rely on the use of a reciprocation rubber diaphragm in association with check-valves to produce flow. The fluid is drawn into a cavity created by the retraction of a rubber diaphragm. At the end of the diaphragm's travel length, the inflow check-valve closes, and the diaphragm moves back in the opposite direction, forcing the fluid to eject from the cavity through an outflow check-valve, the process then repeats, producing fluid flow.

This back and forth motion of the diaphragm creates a pulse or sin wave downstream of the pump. This pulsation, which is a byproduct of the general design, produces vibration and noise. In some applications, the pulsation produced by the pump leads to inaccuracy and over time, can shorten the life of equipment downstream of the pump. These negative characteristics of a diaphragm dosing pump disqualify it from consideration in some applications.

The frequency of maintenance for a diaphragm-based dosing pump is generally greater than other types of dosing pumps. Diaphragm material types vary widely, and are generally selected in association with fluid type, pressure and temperature. Diaphragms must be replaced with relative frequency to avoid the diaphragm tearing and subsequently shutting down the pump.

As a general rule the fluid pumped by a diaphragm-based dosing pump must be free of particulate matter. Pumping material which contains solids can lead to the pump's check-valves not fully closing, causing inaccuracy and a loss of prime.

Diaphragm pumps can sometimes be challenging to prime against backpressure (the pressure contained in the receiving pipe or vessel the pump is feeding, which opposes the pressure created by the pump). To overcome this problem, the travel distance of the diaphragm (the stroke length) must be maximized to overcome backpressure. Once the pump is primed, the new rate of flow can be set by reducing the pumps stroke length.

Diaphragm pumps have a relatively narrow operating envelope. The rate of flow produced by a diaphragm dosing pump is a function of the stroke length, stroke frequency, and diameter of the diaphragm. As these elements change in association with an increase in rate of flow, a decrease in displacement volume and rate of flow accuracy will be encountered.

Dosing pumps without diaphragms do exist, including piston/cylinder pumps. However, piston/cylinder pumps that are currently available all have faults which detract from their accuracy, throughput and reliability. For example, U.S. Pat. No. 3,459,041 to Hippen describes a complex metering device that lacks a timing mechanism, and an external valve. These two drawbacks, plus the meter's complexity, hinder the meter in three ways. First the lack of a timing mechanism eliminated its ability to measure rate of flow (the device only measures total volume). Second, it cannot start and stop flow in conjunction with user input. And third, its reliability is hindered by many moving parts.

The Hippen patent was specifically designed to address two problems associated with a piston/cylinder metering device. These problems were (i) the inability to detect very low rates of flow (this resulted in fluid passing previous piston/cylinder meters undetected), and (ii) backpressure created by two or more valves being closed inside of the device simultaneously. While the Hippen patent aimed to solve these issues, there were in fact additional problems associated with a piston/cylinder metering device which were not addressed by the Hippen patent.

Thus, there remains a need for improved dosing/metering pumps.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter described herein looks to solve the problems associated with a diaphragm-based dosing pump by introducing a unique methodology of controlling flow. This system implements the use of a floating piston, whose position is tracked through a length of a tube. By monitoring the position of the piston in association with time, a very accurate rate of flow can be measured, and in turn controlled.

In conjunction with the piston being tracked, the pump assembly incorporates two internal 3 position valves. These valves work in unison, allowing the pump assembly to start, stop, and internally reverse the direction of flow.

Because the inventive subject matter measures flow through the displacement of a solid object, the need to replace the flexible rubber diaphragm is eliminated. A further advantage is that the piston is not as susceptible to chemical degradation as the diaphragm, as the material in question does not require it to flex. This advantage greatly reduces the frequency with which maintenance must be performed, increasing its reliability, and decreasing customer cost.

The frequency of the pulse associated with a dosing meter is greatly reduced in the invention. The invention produces a measurable pulse only after a given volume has been displaced, as opposed to the almost continuous pulse produced by most dosing pumps.

The accuracy and repeatability of the flow rates and volumes produced by the pump described herein are measurably better than that of a diaphragm dosing pump. This is the result of tracking a solid object, as opposed to displacing a flexible diaphragm over a specific distance to produce a scheduled rate of flow.

The inventive subject matter provides apparatus, systems and methods in which a reciprocating piston meter/pump assembly comprises a cylinder housing (ref FIGS. 1a, 1b, and 7a, 109) separated by a piston (ref FIG. 7a, P1) into two chambers (ref FIG. 7a, C1 and C2) and measures the flow rate and volume of a fluid by tracking the distance traveled by piston assembly P1 (FIG. 7a) along a pushrod (111, FIG. 7a) running through the cylinder housing (ref FIG. 7a, 109). Fluid flow is started and stopped by valves inside of an endcap (101L, 103L and 101R,103R, FIG. 7a) at each end of the cylinder housing and or by modulating one or more pump motors. It is contemplated that the reciprocating piston pump can be used to accurately control flow and measure specific volumes of fluid.

The specific volume to be produced by the reciprocating piston pump can be determined using an output signal of the encoder tracking device (209, 211 FIG. 5). This operation will repeat, allowing the user to fill multiple containers with a specific volume of fluid, or perform similar tasks associated with batching or dosing operations. The time interval between the closed position and open position can also be programmed.

Fluid pressure is provided by one low flow (FIG. 1a, 363) and (or) one high flow (FIG. 1a, 361) geared pump(s). Note that alternate embodiments of the reciprocating piston pump are designed to function with just one of the two pumps shown in FIG. 1a (ref FIG. 1d). Each pump is plumed directly into the pump manifold assembly (ref FIG. 2a, 361, 363). Fluid enters the pump manifold at point A (ref FIG. 2a), where fluid flows through air/fluid valve 293 and into hydraulic tee 257, where flow is separated into two separate hydraulic lines.

The right (R) side of tee 257 directs fluid to high flow pump 361 (FIG. 2a), a fluid bypass line is plumed around high flow pump 361 and controlled via bypass valve 289. The left (L) side of tee 257 directs fluid to low flow pump 363 (FIG. 2a). Fluid exits each pump under pressure, passing through check valves 277 and 279, enters hydraulic tee 255 where it merges with fluid from the adjacent pump line and is directed into the inflow cylinder manifold through tee 253.

Fluid flows through tee 253 (FIG. 2a) of the inflow cylinder manifold towards the respective open valve in one of the two endcaps (103L and 103R, FIG. 2a) at either end of the cylinder housing. Each endcap has one inlet (ref FIG. 2a-2b, 601, 603), and one outlet (605, 607).

The inlet (601, 603 FIG. 7a) and outlet (605, 607 FIG. 7a) of each respective endcap have passages which couple one inlet and one outlet to a chambers C1 and C2 of FIG. 7a inside of the cylinder assembly. The remaining two inlet and outlet passages are closed inside of each respective endcap.

A pushrod (111) runs through the center of cylinder 109 of FIG. 7a. Machined into the end of each pushrod is a series of holes drilled perpendicular to the pushrod's longitudinal axis. There are four sets of holes on the end of each pushrod (ref. FIG. 3b). A bore is drilled into the center of each end of the pushrod. The bore is parallel to the pushrod's longitudinal axis. One third of the bore is tapped. Each through hole connects the bore of the pushrod to the inside of each valve. Each of the four sets of holes at each end of the pushrod encompass the rod around its circumference. Valve pin 113L and 113R are screwed into the end of each pushrod, creating the pushrod valve assembly. Valve pin 113L and 113R (ref FIG. 3b) divide the bore inside of each pushrod into two small valve chambers (V1 and V3 of FIG. 3b), each chamber is coupled by a bank of holes, of which, there are a total of four banks, two on each end of pushrod 111.

The pushrod valve routes fluid from one of two open inlet ports (601 or 603 FIG. 7a) to cylinder chamber C1 or C2. At the same time, on the opposite end of the cylinder assembly, the pushrod valve routs fluid from cylinder chamber C1 or C2 to one of two open outlet ports (605 or 607).

Bank 1, 2 (ref FIG. 3b) are located closest to the center of pushrod valve 111, Bank 3, 4 are closest to each end of pushrod 111. When the pushrod valve assembly is in a center position (position A of FIG. 3b), the valve on each end of the pushrod assembly is closed, and fluid cannot pass through V1, V2, V3 or V4 (ref FIG. 3b). In position B, bank 1 is open, bank 3 is closed, on the opposite end of the pushrod assembly, bank 2 is closed and bank 4 is open. In position C, bank 1 is closed, bank 3 is open, on the opposite side, bank 2 is open and bank 4 is closed.

Each end of the pushrod valve assembly is positioned at a junction between three endcap orifices O1, O2 and O3 (ref FIG. 8a) relative to each bank of holes at the end of each pushrod. At any one time, one bank of holes will align with two of the three endcap orifices, creating one continuous passage into or out of the reciprocating piston pump. Through one bank, fluid will flow into the reciprocating piston pump, through the opposite bank, fluid will flow out of the reciprocating piston pump.

Inside of each endcap (101L, 103L and 101R, 103R) through the actuation of a motor (371 FIG. 2b) mounted at the end of endcap101L (FIG. 2b). Movement of the pushrod valve assembly (PRV FIG. 3a) simultaneously controls four passages leading into and out of the reciprocating piston pump. At any one time, two of the four complete passages will be closed, one inflow path will be open, and one outflow path will be open. When the inflow passage of either endcap is open, the outflow passage of the opposite endcap will also be open. It is not possible for two inflow or two outflow passages to be open at any one time.

Piston assembly (P1, FIG. 7a) located inside of cylinder housing 109 (FIG. 7a) moves in conjunction with each chamber (C1 or C2) simultaneously filling on the inflow side and draining on the outflow side. The position of the piston is tracked with a linear encoder (209, 211 FIG. 5), allowing the reciprocating piston pump to measure and control rate of flow and volume.

As piston assembly (P1 FIG. 7a) approaches the end of the cylinder (109 FIG. 7a), the pushrod valve assembly (PRV FIG. 3a), driven by a motor (371 FIG. 7a) will shift to a new position, changing the path of the fluid which runs through the pushrod banks. This new position closes the inflow path and opens the outflow path in one endcap and opens the inflow path and closes the outflow path of the opposite endcap, reversing the flow of fluid inside the reciprocating piston pump. The chamber, which was being filled by the inflow path, is now being drained by the outflow path and vice versa on the opposite side of the piston. The piston is now moving in the opposite direction.

The flow of fluid can be stopped with precision by moving the pushrod valve to a second position. In this position, the inflow and outflow ports in both endcaps are closed. This feature, in conjunction with the modulation of the high flow pump, may allow the user to specify a given volume. The reciprocating piston pump will calculate the distance the piston must travel in order to displace the requested quantity.

When P1 reaches the specified volumetric target distance, the pump will turn off, and the valves in each endcap may simultaneously close.

Fluid exits the device from one of two outflow ports (605 or 607) in each endcap. Fluid is routed through the exit manifold to a tee (251 FIG. 7*a*) adjacent to the pump manifold entry tee (253) where fluid exits the device.

The reciprocating piston pump solves several problems not only seen in the Hippen patent, but in other previous piston/cylinder metering devices. These problems appear in four categories:

1) Rate of Flow—The Hippen patent, and previous inventions, could only record the total volume which passed through them. They did not record/report rate of flow, as the devices could not measure time in accordance with flow. For example, if 5 gallons passed through the meter in 1 minute, the Hippen device would only display 5 gallons, not the rate of 5 gallons per minute, as it did not contain an internal clock.

2) Shutoff Valve—The Hippen patent cannot start or stop flow in conjunction with programmed user input, as it does not contain an automatic or manually controlled shutoff valve.

Contrary to the Hippen patent, the reciprocating piston pump described herein contains an internal shutoff valve which is controlled automatically in coordination with user input. This enables the reciprocating piston pump to perform the following tasks:

Batching—Filling multiple containers repeatedly with an identical quantity of fluid.

Dosing—Producing a user specified quantity of fluid at a specific rate of flow, typically under high pressure and used predominantly to treat large bodies of fluid, such as wastewater treatment.

Custody Transfer—The transfer of a specific amount of fluid for purchase.

3) Accuracy—The Hippen patent was unable to track the precise location of the piston (while in motion). Additionally, the Hippen patent lacked a timing mechanism, therefore it could not accurately track rate of flow, nor could it start/stop flow after a target volume has been reached.

The reciprocating piston pump in the present application can precisely track piston position using a linear encoder.

The solid pushrod ensures that the valves inside of either endcap switch at the same time, in perfect unison with one and other. The use of a solid pushrod, as opposed to a pushrod which actuates individual spring-loaded valves through a lever, as the Hippen device does, eliminates numerous parts, and makes the device significantly more reliable and accurate.

4) Simplicity—The reciprocating piston pump herein contains only three moving parts, the PRV (pushrod valve assembly), the piston, and the encoder target housing. This limited number of moving parts ensures the reciprocating piston pumps reliability, and in turn its accuracy.

Linear Encoder—The reciprocating piston pump uses a linear encoder in conjunction with magnets embedded in the piston to measure the position of the piston along its longitudinal track. As used herein, "magnets" includes magnetically attractable elements and elements that produce magnetic fields.

Pushrod Valve Assembly—The reciprocating piston pump uses a more efficient valve configuration than the Hippen invention. The reciprocating piston pump routes fluid through the same path, in either direction, and does not displace fluid when actuated.

Piston—The piston assembly floats inside of the cylinder housing and is tracked by the linear encoder. A set of ring magnets encompass the piston, which is magnetically coupled with the external linear target housing.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

FIG. 7*a* depicts the reciprocating piston pump void of fluid. The major assemblies included in FIG. 7*a* are the left and right endcap assemblies (101L, 103L, 101R and 103R), the cylinder housing assembly and end caps (109, 105L and 105R), the pushrod valve motor assembly (371, 381, 121 and 107), the piston assembly (P1), the pushrod valve assembly (111, 113L, 113R), the fluid exit manifold (251, 313, 315, 281 and 283), orifice 3 (O3) represents the exit orifice, and the fluid entry manifold (253, 317, 319, 285 and 287) orifice 2 (O2) represents the entry orifice. Included on the fluid entry manifold are temperature sensor (351) and pressure sensor (353).

FIG. 7b is a horizontal cross-sectional view of a reciprocating piston pump of FIG. 1a. FIG. 7b depicts the reciprocating piston pump with fluid entering the pump at orifice 2 (O2) and flowing into the right chamber through the entry manifold, and exiting the pump from the left chamber through orifice 3 (O3) via the exit manifold. The major assemblies included in FIG. 7a are the left and right endcap assemblies (101L, 103L, 101R and 103R), the cylinder housing assembly and end caps (109, 105L and 105R), the pushrod valve motor assembly (371, 381, 121 and 107), the piston assembly (P1), the pushrod valve assembly (111, 113L, 113R), the fluid exit manifold (251, 313, 315, 281 and 283), orifice 3 (O3) represents the exit orifice, and the fluid entry manifold (253, 317, 319, 285 and 287) orifice 2 (O2) represents the entry orifice. Included on the fluid entry manifold are temperature sensor (351) and pressure sensor (353).

FIG. 7c is a horizontal cross-sectional view of a reciprocating piston pump of FIG. 1a. FIG. 7c depicts the reciprocating piston pump with the pushrod valve in a closed position, preventing fluid from passing through the reciprocating piston pump. The major assemblies included in FIG. 7a are the left and right endcap assemblies (101L, 103L, 101R and 103R), the cylinder housing assembly and end caps (109, 105L and 105R), the pushrod valve motor assembly (371, 381, 121 and 107), the piston assembly (P1), the pushrod valve assembly (111, 113L, 113R), the fluid exit manifold (251, 313, 315, 281 and 283), orifice 3 (O3) represents the exit orifice, and the fluid entry manifold (253, 317, 319, 285 and 287) orifice 2 (O2) represents the entry orifice. Included on the fluid entry manifold are temperature sensor (351) and pressure sensor (353).

FIG. 7d is a horizontal cross-sectional view of a reciprocating piston pump of FIG. 1a. FIG. 7d depicts the reciprocating piston pump with fluid entering the pump at orifice 2 (O2) and flowing into the left chamber through the entry manifold, and exiting the pump from the right chamber through orifice 3 (O3) via the exit manifold. The major assemblies included in FIG. 7a are the left and right endcap assemblies (101L, 103L, 101R and 103R), the cylinder housing assembly and end caps (109, 105L and 105R), the pushrod valve motor assembly (371, 381, 121 and 107), the piston assembly (P1), the pushrod valve assembly (111, 113L, 113R), the fluid exit manifold (251, 313, 315, 281 and 283), orifice 3 (O3) represents exit orifice, and the fluid entry manifold (253, 317, 319, 285 and 287) orifice 2 (O2) represents the entry orifice. Included on the fluid entry manifold are temperature sensor (351) and pressure sensor (353).

FIG. 8a is a perspective cross-sectional view of the right endcap assembly of FIG. 1a. FIG. 8a depicts pushrod valve assembly (PRV) in a first position where a passage between O2 (FIG. 7a) and chamber C1 is open, and a second passage between chamber C1 (FIG. 7a) and O3 is closed. Fluid from entry orifice O2 enters void V1 from O2 and exits void V1 through O1 where it is routed into chamber C1 through six channels (FIG. 8a CH1-6).

FIG. 8b is a perspective view of the right endcap assembly of FIG. 1a. FIG. 8a depicts pushrod valve assembly (PRV) in a second position where a passage between chamber C1 and O3 is closed, and a passage between O2 and chamber C1 is closed.

FIG. 8c is a perspective cross-sectional view of the right endcap assembly of FIG. 1a. FIG. 8a depicts pushrod valve assembly (PRV) in a third position where a passage between chamber C1 (FIG. 7a) and O3 is open, and a second passage between O2 (FIG. 7a) and chamber C1 is closed. Fluid enters void V2 from O1 and exits void V2 through O3 where it is routed to exit orifice O3.

FIG. 8d is a perspective cross-sectional view of the right endcap assembly of FIG. 1a. FIG. 8a depicts pushrod valve assembly (PRV) in a first position where a passage between O2 (FIG. 7a) and chamber C1 is open, and a second passage between chamber C1 (FIG. 7a) and O3 is closed.

FIG. 8e is a perspective cross-sectional view of the right endcap assembly of FIG. 1a. FIG. 8a depicts pushrod valve assembly (PRV) in a third position where a passage between chamber C1 (FIG. 7a) and O3 is open, and a second passage between O2 (FIG. 7a) and C1 is closed.

DETAILED DESCRIPTION

Figure 1A:
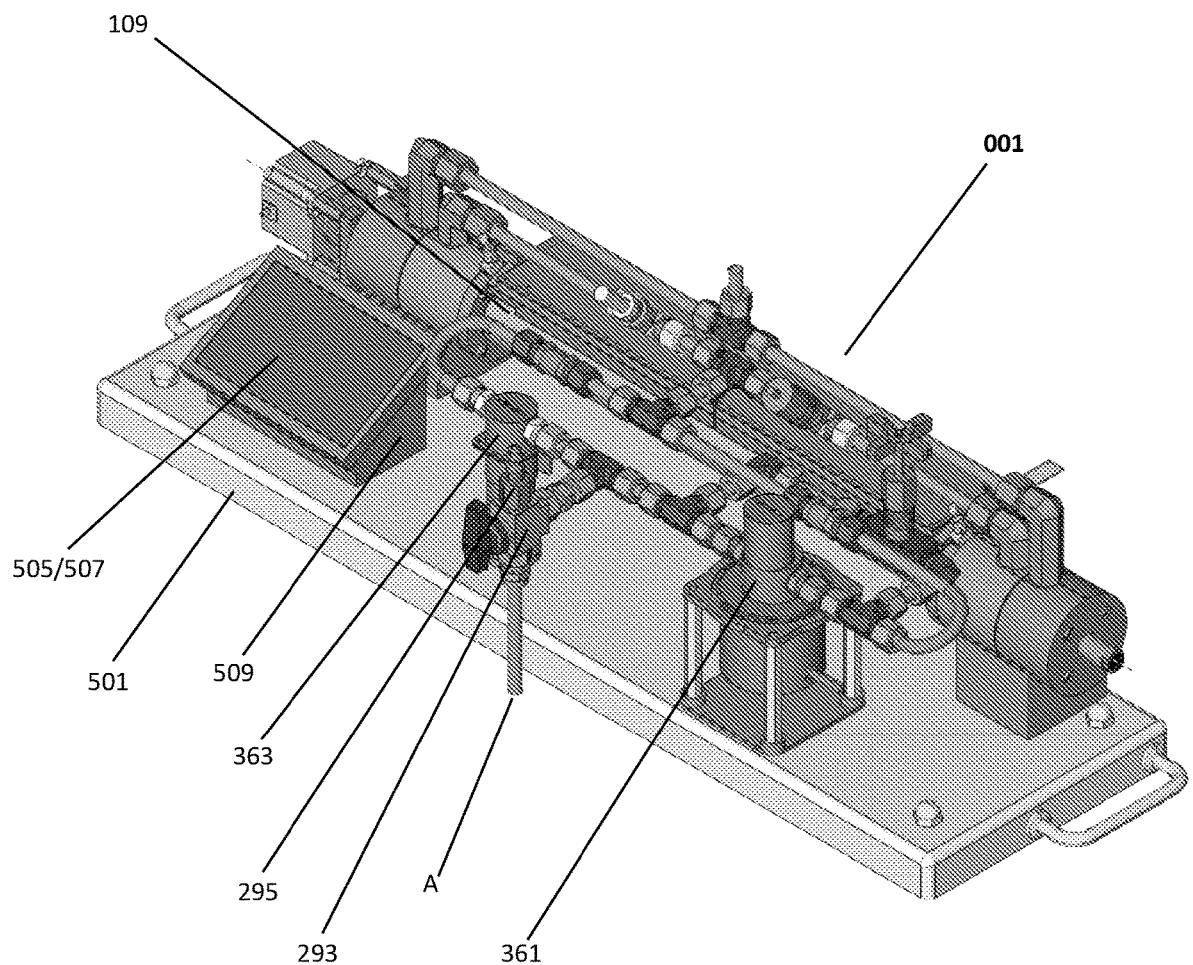
FIG. 1*a* is a front, right, top perspective view of an embodiment of a reciprocating piston pump.

In some embodiments, the numbers expressing quantities, properties, conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless specified otherwise, the left side of the reciprocating piston pump is symmetrical to its right side. The letter "R" designates the right side; the letter "L" designates the left side.

Figure 1B:
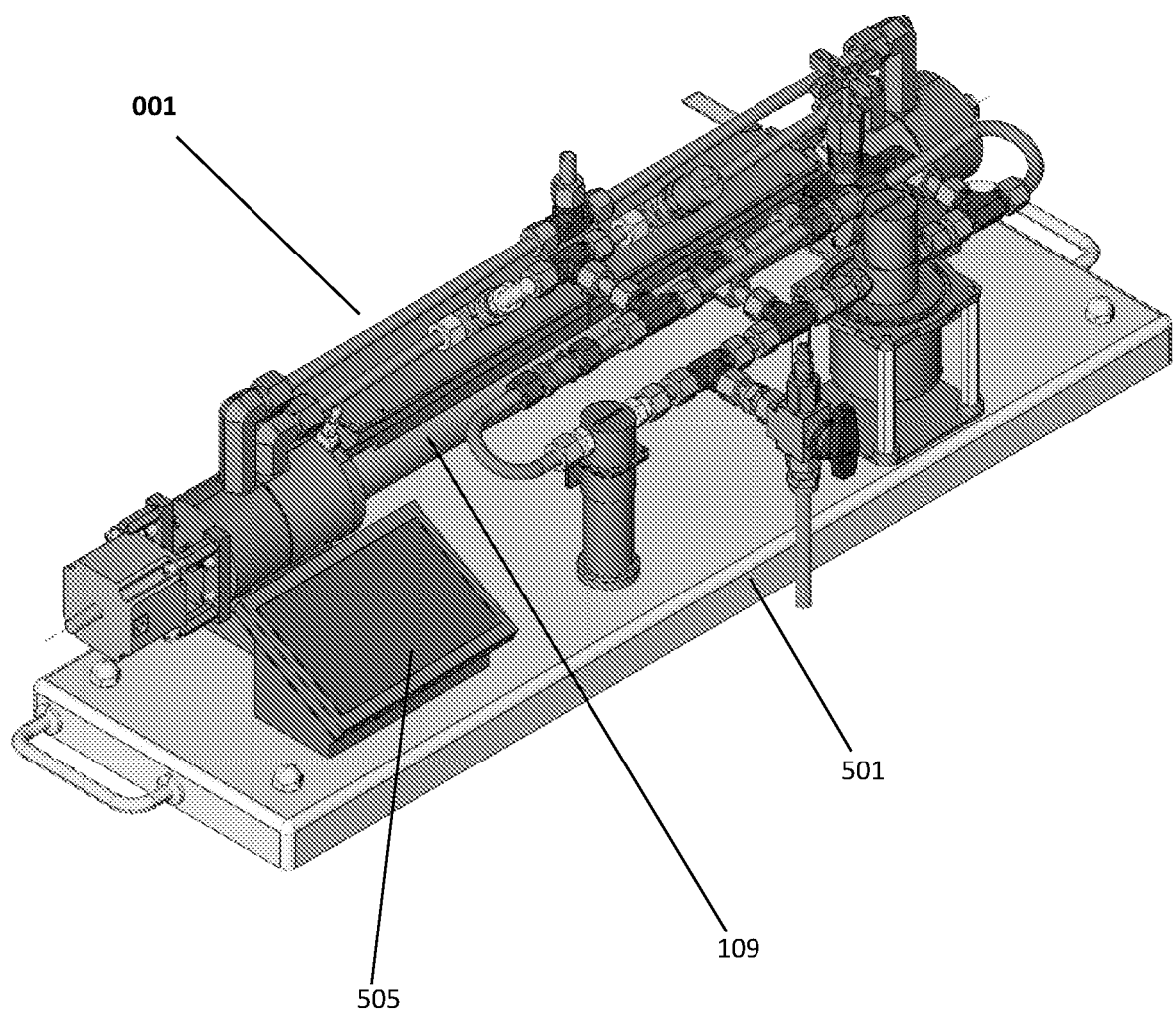
FIG. 1*b* is a front, left, top perspective view of the reciprocating piston pump of FIG. 1*a*.
Figure 1C:
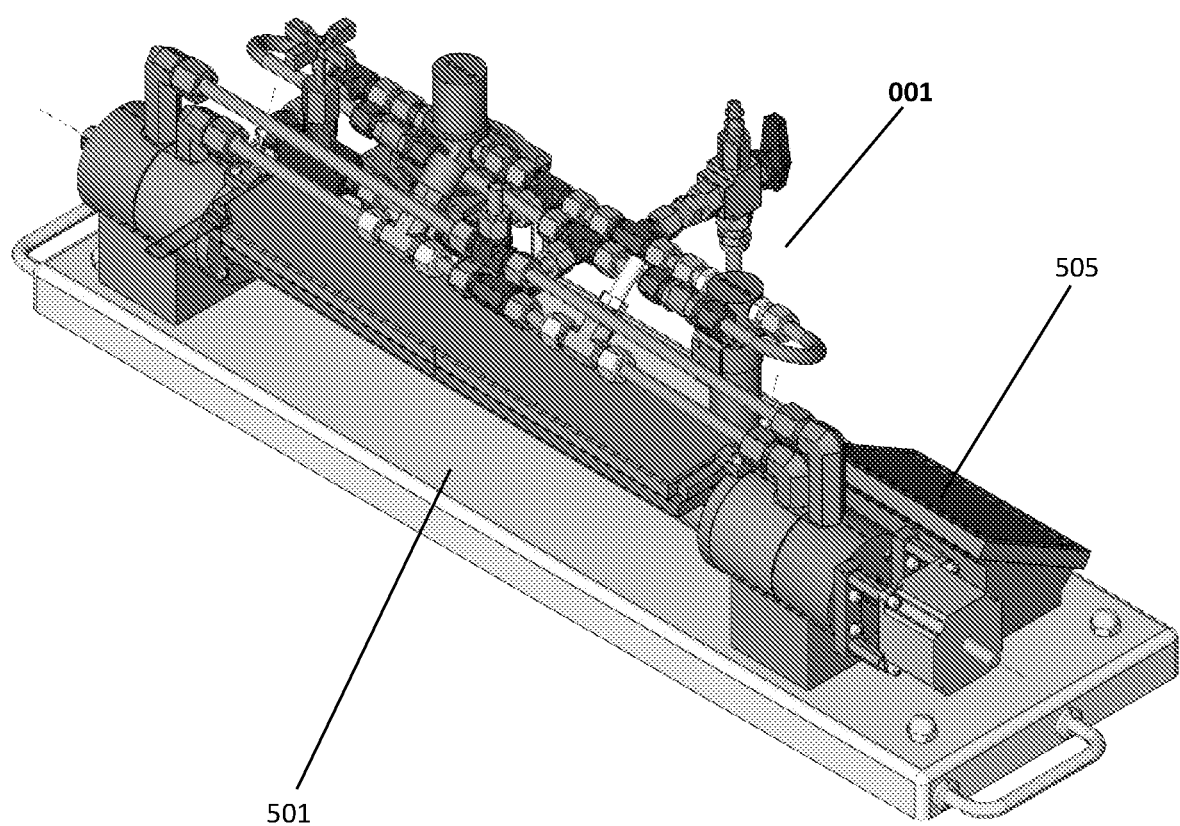
FIG. 1*c* is a rear, left, top perspective view of the reciprocating piston pump of FIG. 1*a*.

FIGS. 1a-c show an embodiment of a reciprocating piston pump 001. FIG. 1a is a front, right, top perspective view of an embodiment of a reciprocating piston pump 001. FIG. 1b is a front, left, top perspective view of the reciprocating piston pump 001 of FIG. 1a. FIG. 1c is a rear, left, top perspective view of the reciprocating piston pump 001 of FIG. 1a.

Figure 1D:
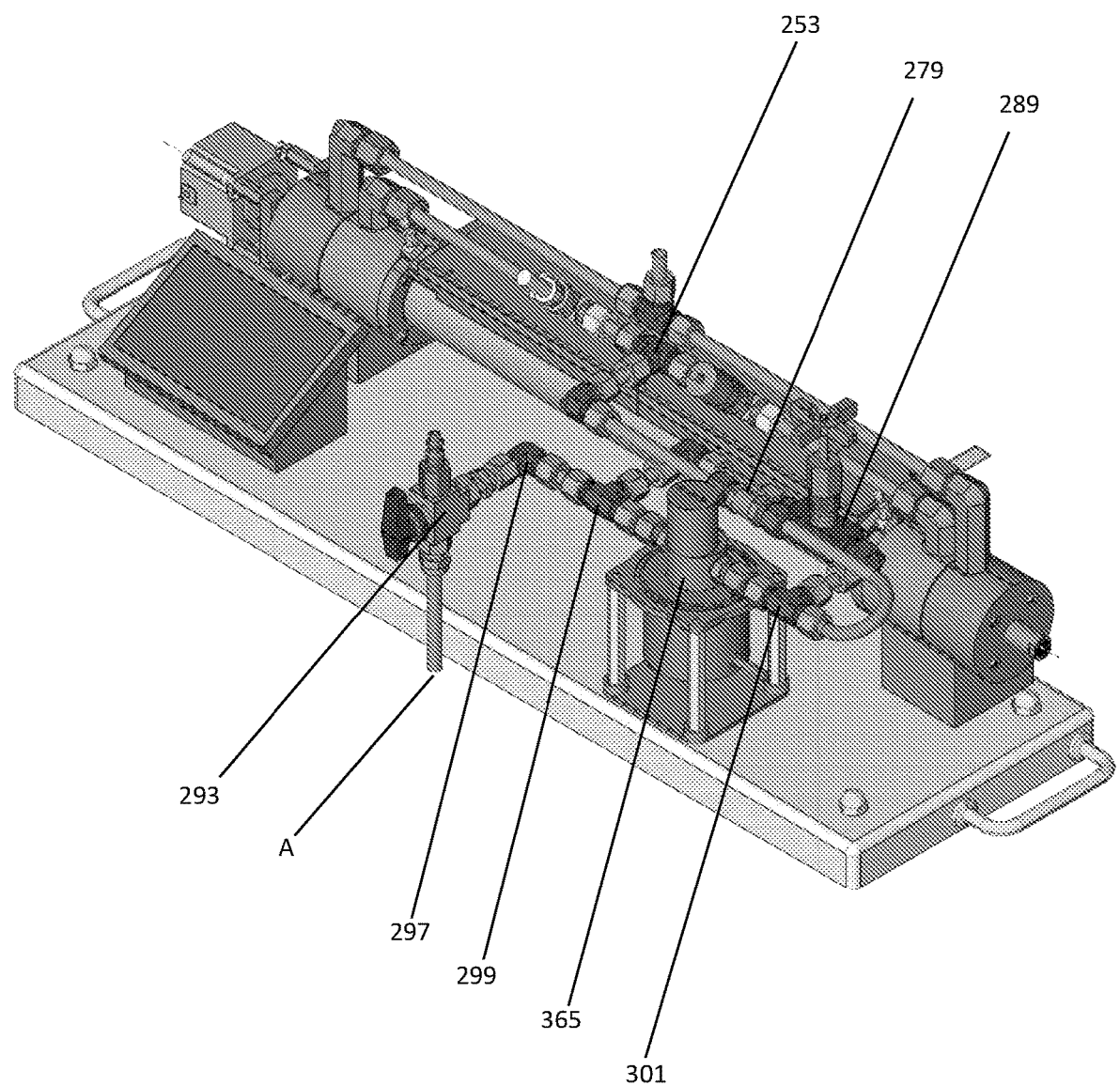
FIG. 1*d* is a front, right, top perspective view of an alternate embodiment of a reciprocating piston pump.

FIG. 1d shows an alternate embodiment of a reciprocating piston pump. FIG. 1d is a front, right, top perspective view.

The primary components which makeup the pump assembly in its totality are depicted in FIGS. 1a, 1b and 1c. The device is comprised of 8 primary parts, which include: 1) Endcaps, 2) Inlet and outlet manifolds, 3) Piston/cylinder housing, 4) Pushrod Valve assembly, 5) High Flow and Low Flow pumps, 6) Plumbing, 7) Linear encoder, 8) Computer and Display.

1. Endcaps—Each endcap is comprised of two separate parts and bolted together to form one individual endcap. The left endcap (FIG. 2b) is comprised of 101L and 103L and bolted together with bolts 389. The right endcap (FIG. 2b) is comprised of 101R and 103R and bolted together with bolts 391.

Each endcap (FIG. 2a-b, 101L, 103L and 101R, 103R) contains one inlet port (601, 603) and one outlet port (605, 607). The fluid enters the device through a single orifice (FIG. 7a O2) in the inlet manifold, continues through a short network of pipe, and enters one of two endcaps (FIG. 2a-b, 101L, 103L or 101R, 103L) through one of two inlet ports (FIG. 2b 601 or 603).

The two endcaps (101L, 103L, and 101R, 103R) are identical to one and other. Each contain a 3-position valve which is rigidly coupled through a pushrod (FIG. 2b, 111) to the opposite endcap. The position of each valve inside of the endcaps operates in opposition to its counterpart. As shown in FIG. 2b, when endcap 101L, 103L has an open inlet port (601) and a closed outlet port (605), endcap 101R-103R will have a closed inlet port (603) and an open outlet port (607). Because the valves in each endcap are rigidly coupled together, it is not physically possible for any two inlet or outlet ports to be open at the same time.

Fluid being measured will always exit the same endcap in which it entered. It is not physically possible for fluid to enter the left endcap and exit the right endcap.

2. Inlet and Outlet Manifolds—Attached to each endcap inlet (FIG. 2b, 601, 603) and outlet (FIG. 2b, 605, 607) are manifolds which direct the flow of fluid into each corresponding orifice.

Figure 6:
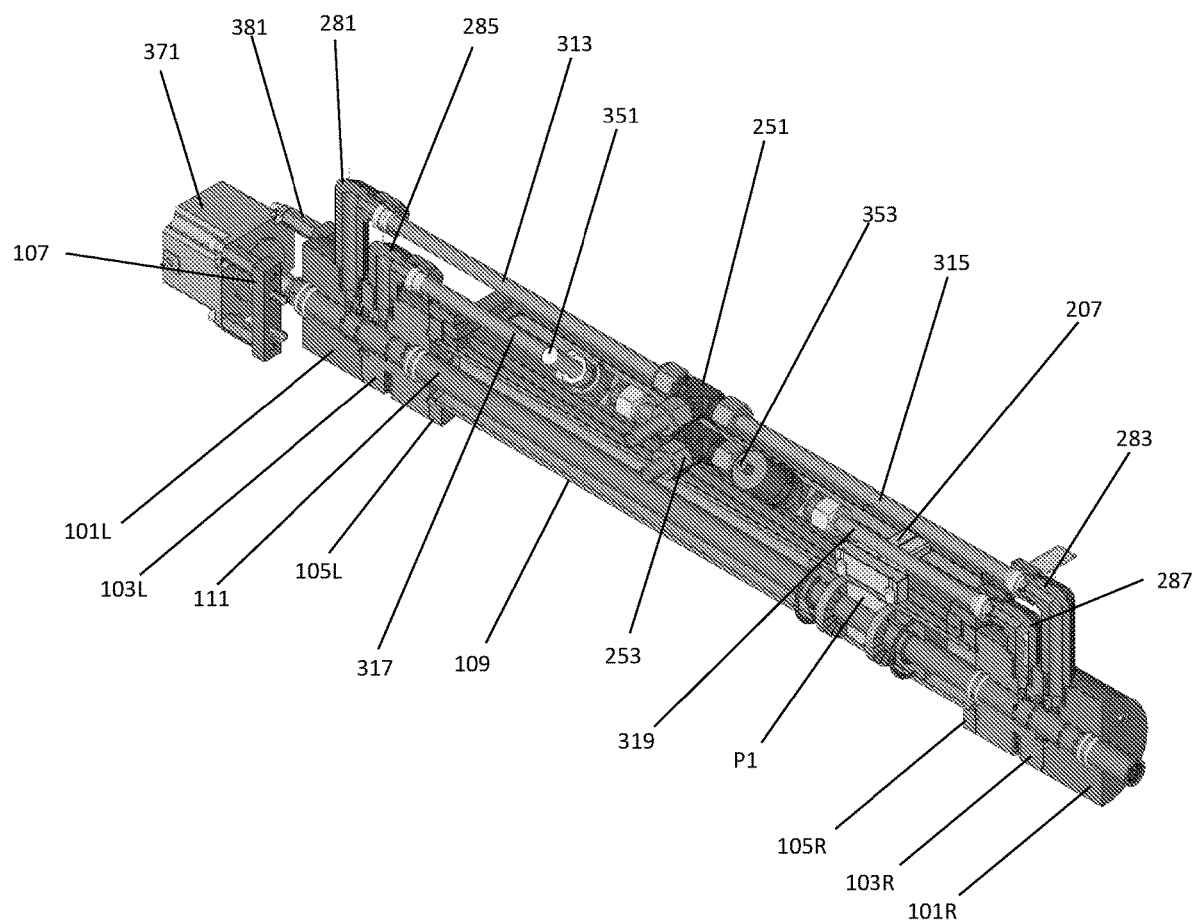
FIG. 6 is a perspective cross-sectional view of a reciprocating piston pump of FIG. 1*a*, including the left and right endcap assemblies (101L, 103L, 101R and 103R), the piston tube assembly and end caps (109, 105L and 105R), the pushrod valve motor assembly (371, 381 and 107), the piston assembly (P1), the pushrod valve (111), the fluid exit manifold (251, 313, 315, 281 and 283), and the fluid entry manifold (253, 317, 319, 285 and 287). Included on the fluid entry manifold are temperature sensor (351) and pressure sensor (353).

Inlet Manifold—Fluid enters the inlet Manifold through hydraulic tee 253 (FIG. 6), orifice O2 (FIG. 7a), and is routed into one of two open endcap inlets via hydraulic line 317 or 319. Affixed to hydraulic line 317 is temperature sensor 351 (FIG. 6), affixed to hydraulic line 319 is pressure sensor 353 (FIG. 6).

Figure 7A:
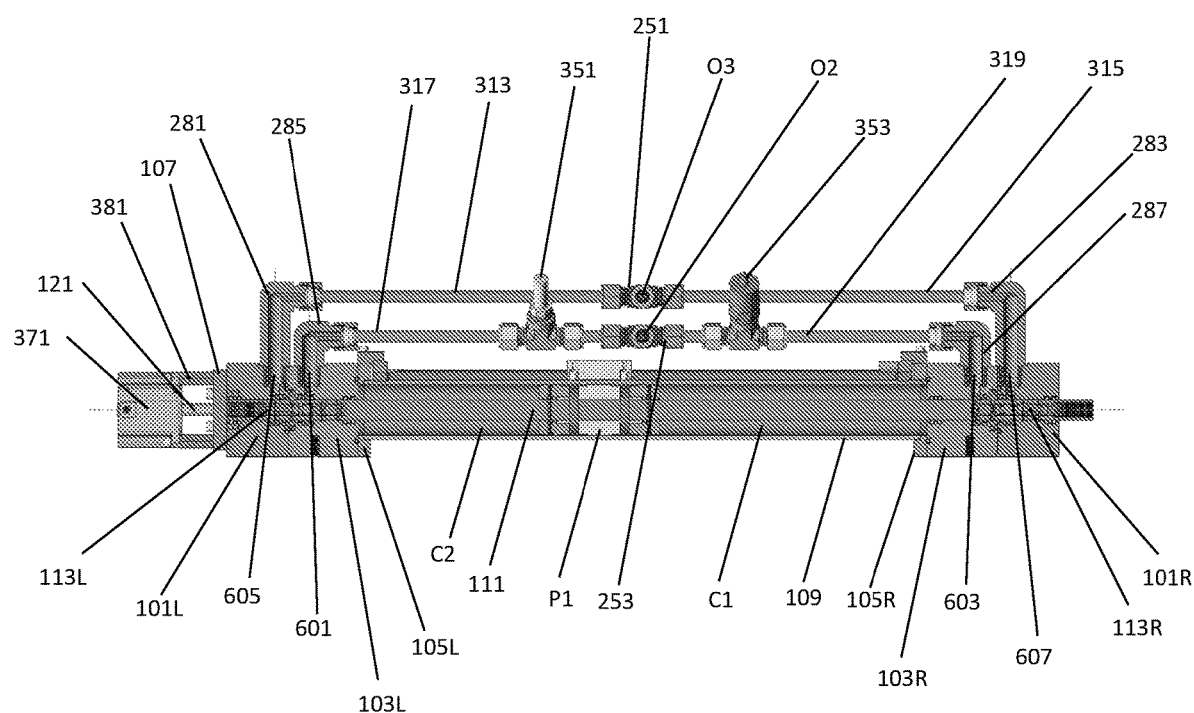
FIG. 7*a* is a horizontal cross-sectional view of a reciprocating piston pump of FIG. 1*a*.

Outlet Manifold—Fluid enters the outlet Manifold through hydraulic elbow 281 or 283 (FIG. 6) and is routed through hydraulic line 313 or 315 where it enters hydraulic tee 251 (FIG. 6) and exits the reciprocating piston pump through orifice O3 (FIG. 7a).

3. Piston/Cylinder housing—The cylinder housing (FIG. 4a, FIG. 5, 109) contains the piston, comprised of parts 117L, 117R, 215L, 215R and 119. Together these parts make up piston assembly P1. Inside piston assembly P1 are ring magnets 215L and 215R. Ring magnets 215L and 215R are magnetically coupled to encoder target magnets 213L and 213R which are affixed to encoder target assembly 207. The encoder target assembly (207) houses encoder target circuit board 209 (ref FIG. 5).

Figure 4A:
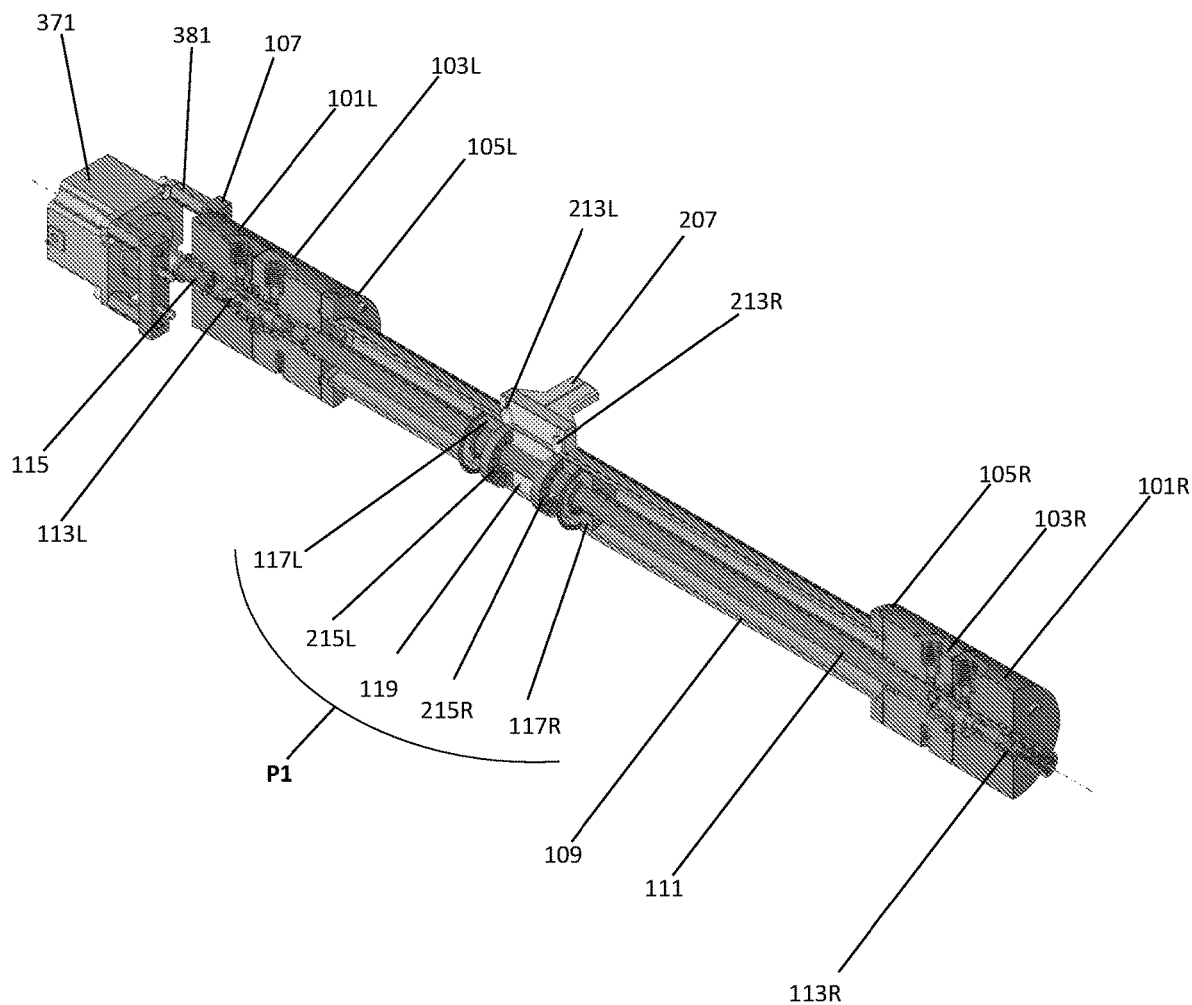
FIG. 4*a* is a perspective cross-sectional view of a reciprocating piston pump of FIG. 1*a*, including the left and right endcap assemblies (101L, 103L, 101R and 103R), the piston tube assembly and end caps (109, 105L and 105R) the pushrod valve motor assembly (371, 381 and 107), the piston assembly (117L, 117R, 215L, 215R, and 119) and the pushrod valve assembly (111, 113L and 113R).
Figure 4B:
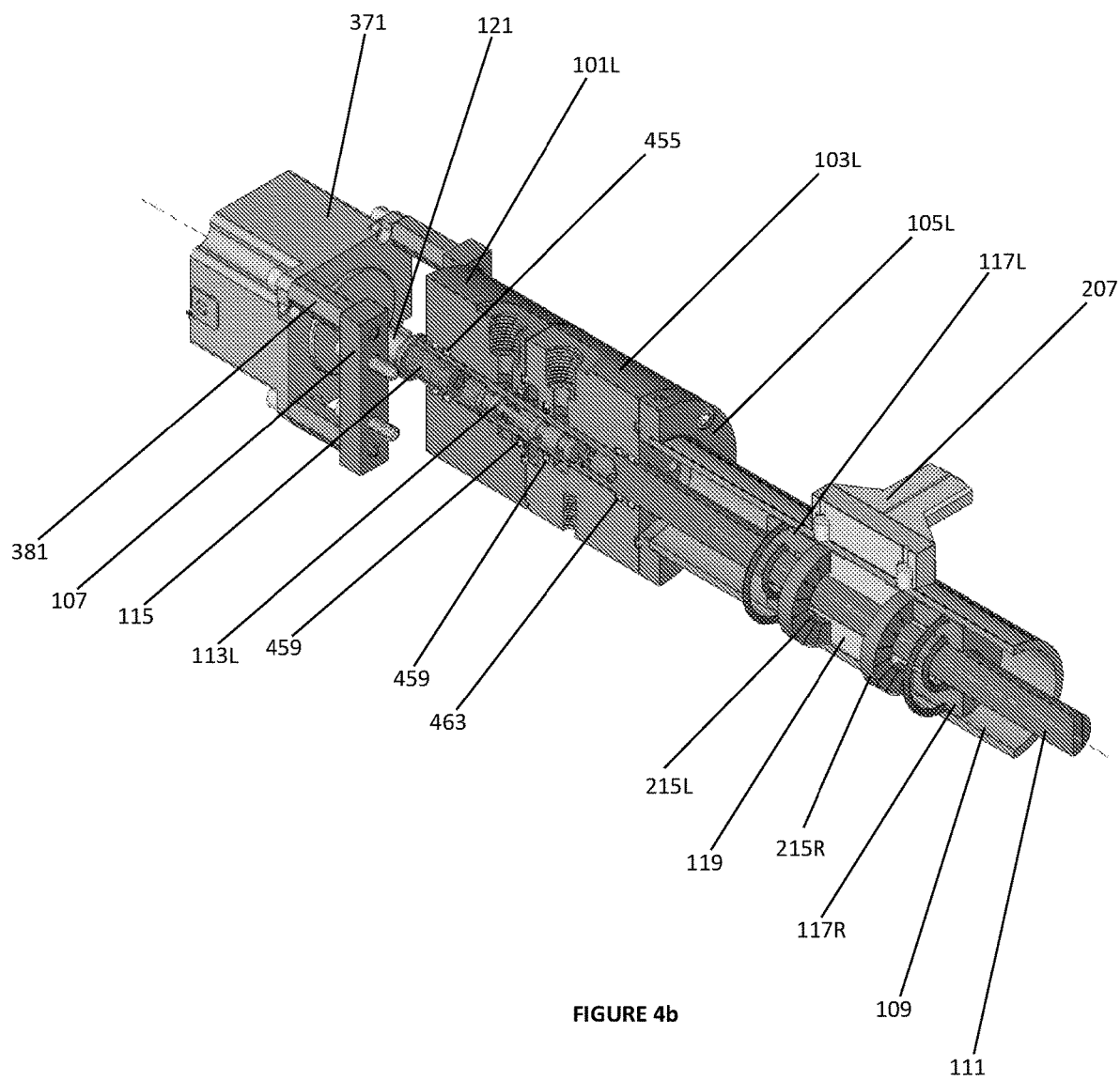
FIG. 4*b* is a perspective cross-sectional view of the left endcap assembly (101L, 103L), the pushrod valve motor (371), the piston assembly (117L, 117R, 215L, 215R, and 119), the pushrod valve (111) and the pushrod valve pin (113L) of a reciprocating piston pump of FIG. 1*a*.

As fluid passes through the reciprocating piston pump 001, piston assembly P1 is displaced longitudinally along the length of cylinder 109 (FIG. 4a). Movement of the piston is measured and recorded when the encoder target circuit board 209, housed in encoder target housing 207 (FIG. 5) and magnetically coupled to piston assembly P1, moves across the longitudinal length of encoder target sensor board 211(FIG. 5).

Figure 5:
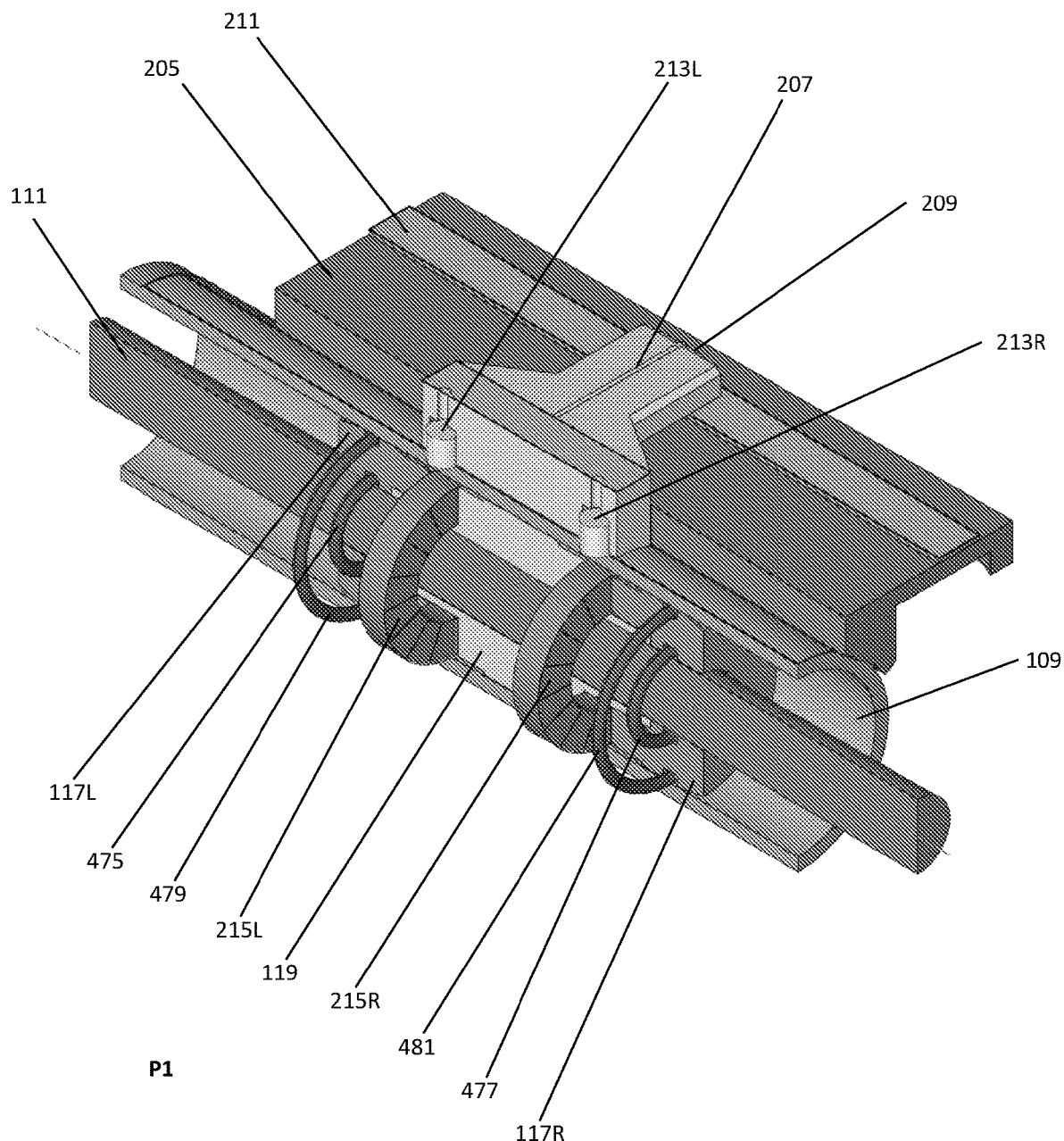
FIG. 5 is a cross-sectional view of piston assembly P1 (117L, 117R, 119, 215L, 215R, 475, 477, 479, and 481), the magnetically coupled encoder target assembly (207, 213L, 213R) and the encoder circuit board sensor and base housing (211, 205) of a reciprocating piston pump of FIG. 1*a*.

Both the inner diameter (ID) and outer diameter (OD) of the piston are sealed against the ID of the cylinder (FIG. 5, 109) and the OD of pushrod (FIG. 5, 111). This prevents fluid from leaking to the opposite side of the piston, which would degrade the pumps accuracy.

Positional data collected by the linear encoder (FIG. 5, 209, 211) allows for the accurate computation of fluid volume, and velocity.

4. Pushrod Valve assembly—Running through the center of the device, along the longitudinal centerline is a pushrod. The pushrod comprises an elongated member having a bore at each end (FIG. 2b, 111).

Figure 3A:
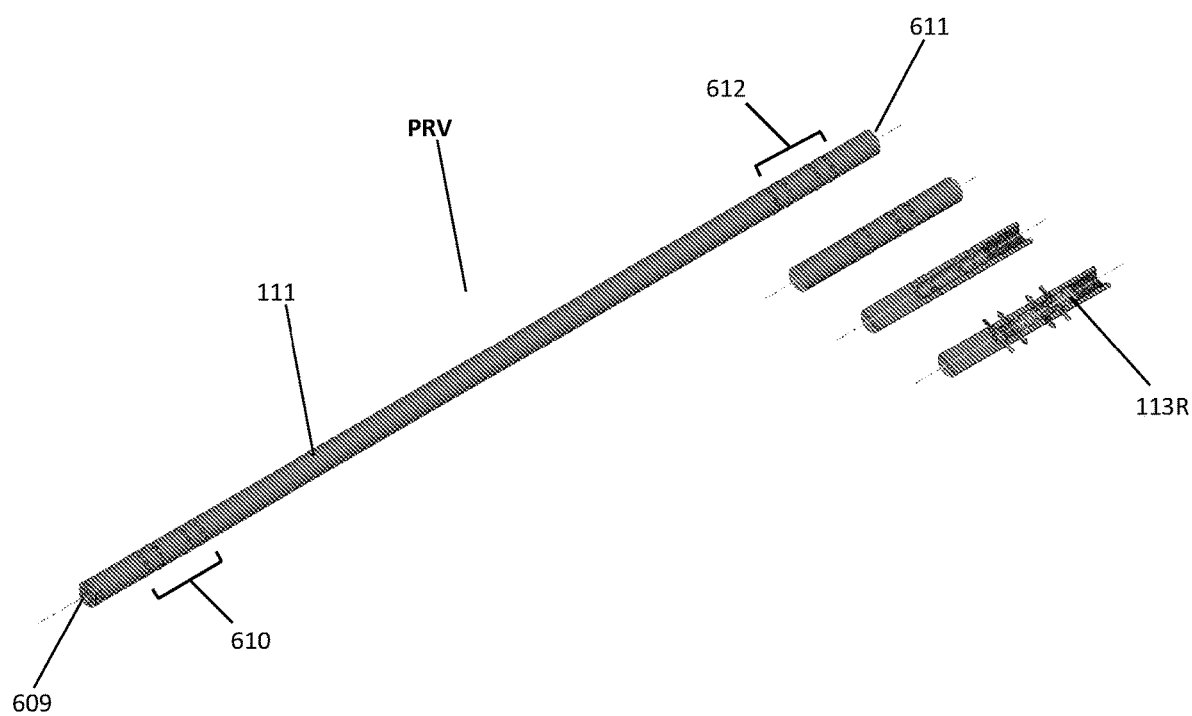
FIG. 3*a* is a perspective/cutaway view of the pushrod valve (111) and pushrod valve pin (113R) of a reciprocating piston pump of FIG. 1*a*. Together parts 111, 113L, and 113R make up the pushrod valve assembly (PRV).
Figure 3B:
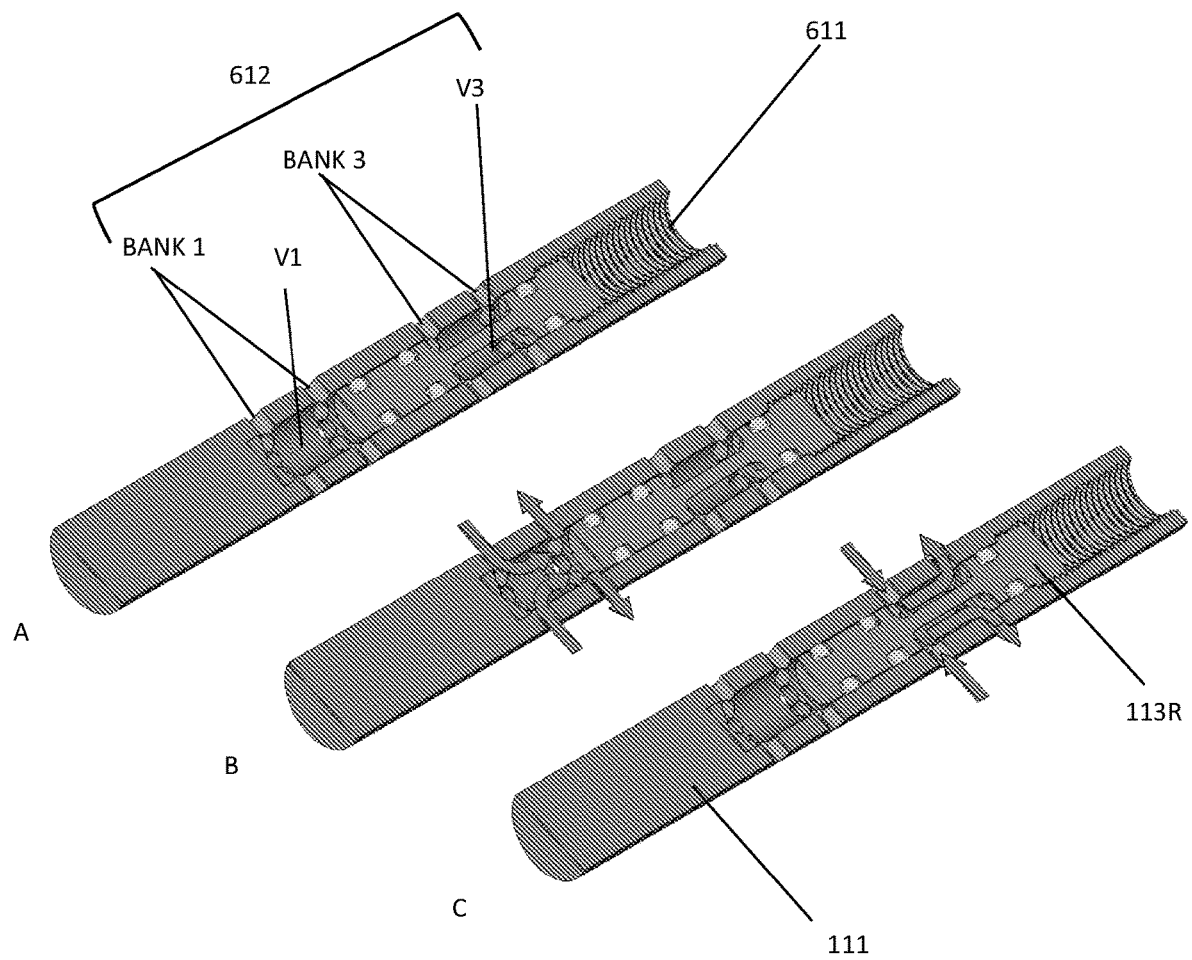
FIG. 3*b* is a perspective/cutaway view of the right side of the pushrod valve assembly. Including the pushrod (111) and the right pushrod valve pin (113R).

At each end of pushrod 111 (FIG. 3a) is a first longitudinal bore 609 and a second longitudinal bore 611. Each bore is tapped to ⅓ the bore's depth (FIG. 3b, 611, 111). First longitudinal bore 609 has a first valve 610 and second longitudinal 611 has a second valve 612. First valve 610 and second valve 612 each intersect a plethora of holes that run perpendicular to the longitudinal bore 609 and 611. Each plethora of holes is divided into banks, of which there are 4 per side (FIG. 3b).

The banks of holes at each end of the pushrod assembly (FIG. 3b 111) allow fluid to flow through the plethora of holes in each valve without disengaging from the seal to which it is mated.

Valve pin 113L and 113R (FIG. 2b, 3a-b) are screwed into each end of pushrod 111. Valve pin 113L and 113R serve to divide and seal hole 609 and 611 into two separate chambers at each end of pushrod 111. Valve chamber 1 and 3 (V1, V3 FIG. 3b) on the right and Valve chamber 2 and 4 on the left (V2, V4).

Each valve chamber (V1, V2, V3 and V4) serves to direct the flow of fluid to or from the associated measurement chamber (C1 and C2 FIG. 7a).

Pushrod 111 is physically actuated by the push rod valve motor (371 FIG. 7a). Movement of the pushrod valve assembly realigns the hole banks (FIG. 3b) with the inlet/outlet orifices located on the inside of each endcap (O1, O2, O3 FIG. 8a).

Pushrod valve assembly (PRV FIG. 3a) is attached to the driveshaft of motor 371 through coupling 115 (FIG. 4a), and is sealed inside of each endcap (101L, 103L and 101R, 103R) by seals 455, 457, 459, 461, 463 and 465.

5. High Flow and Low Flow pumps—Adjacent to inlet tee 257 (FIG. 2a) are two electrical gear pumps. Each pump delivers pressurized fluid to the inlet manifold through tee 253.

The high flow pump delivers pressurized fluid to the inlet manifold at a high rate of flow. The rate of flow produced by the pump is controlled automatically by the reciprocating piston pump computer. The pump modulates the "course" rate of flow and is turned off as the target volume is approached. Once the high flow pump is off, the low flow pump will provide "fine" rate of flow until the target batching volume is reached.

The low flow pump (363, FIG. 2a) delivers pressurized fluid to the inlet manifold at low rates of flow. The flow rate produced by the pump is controlled automatically by the reciprocating piston pump computer. The low flow pump produces very precise flow at very low rates, allowing for accurate target volumes to be measured and batched.

6. Plumbing—Fluid is drawn into the reciprocating piston pump through orifice "A" (FIG. 2a), via suction created by the high and low flow pump (361, 363 FIG. 2a), or the pumps can be gravity fed via a standard hopper.

The high flow pump can be further controlled via a bypass line which travels around the high flow pump, thus allowing greater flow control at lower rates of flow. Bypass valve 289 (FIG. 2a) modulates the return line feeding the high flow pump.

Figure 2A:
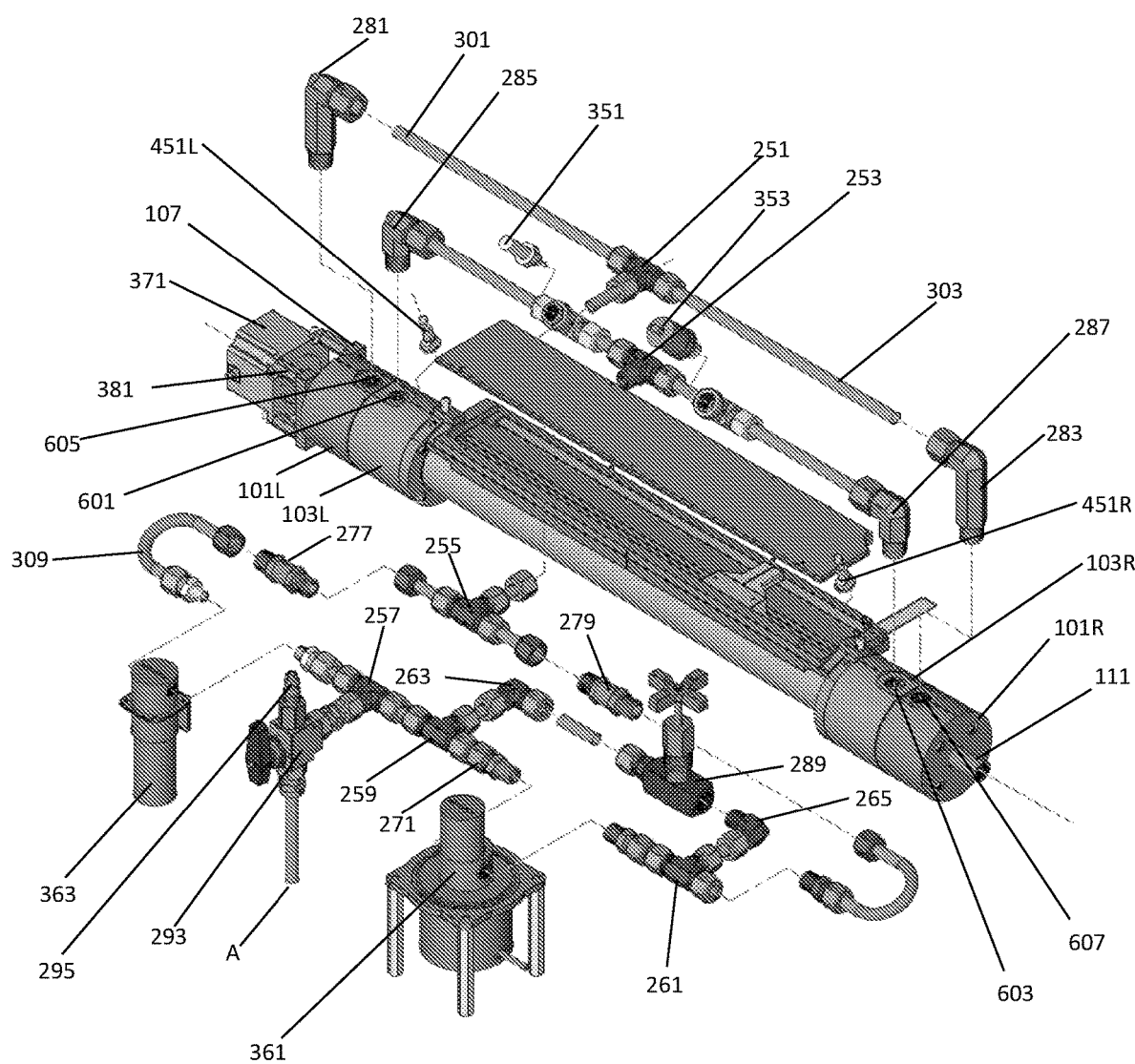
FIG. 2*a* is an exploded perspective view of the reciprocating piston pump of FIG. 1*a*, without display (507) and base (501).
Figure 2B:
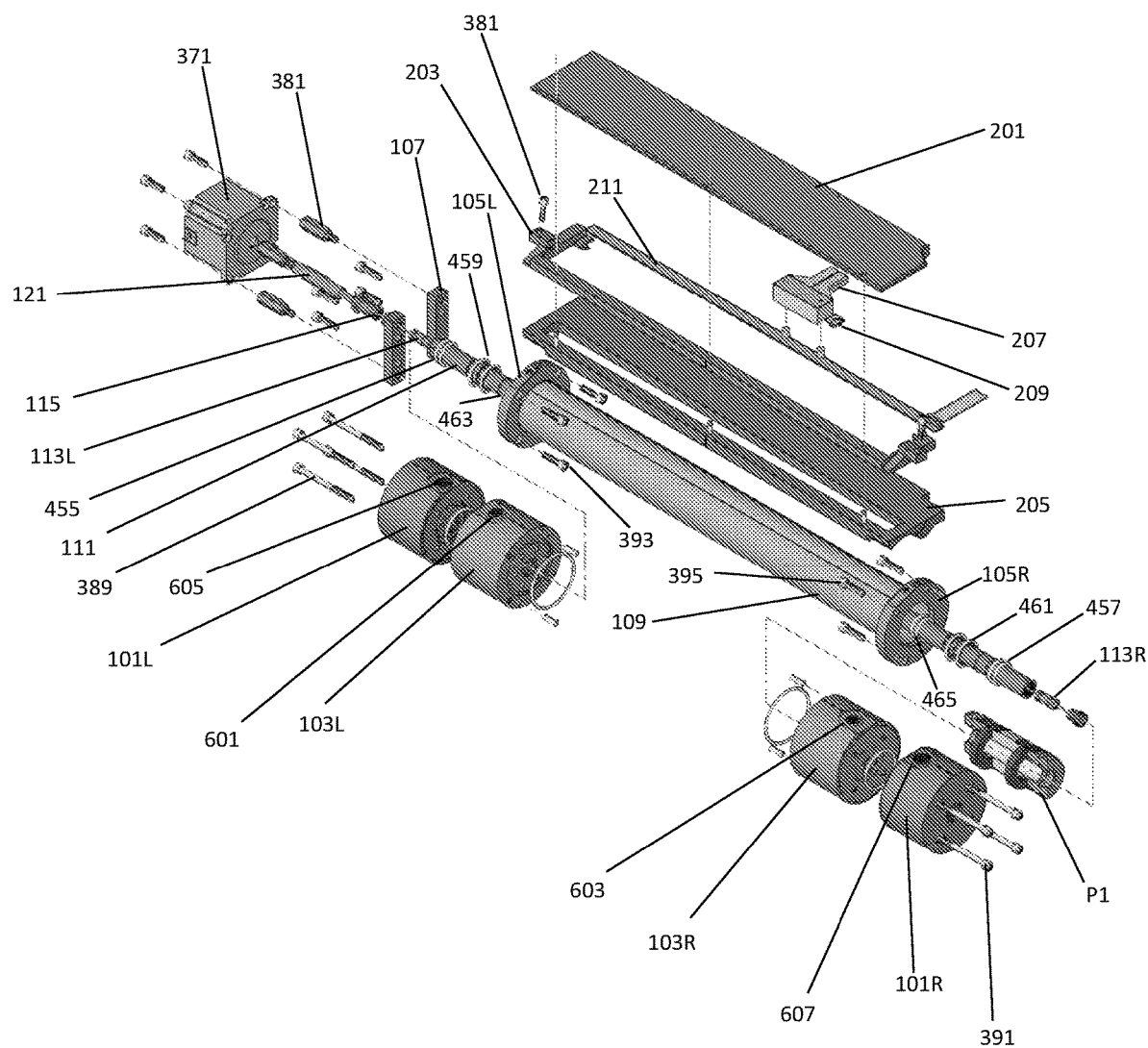
FIG. 2*b* is an exploded perspective view of the reciprocating piston pump of FIG. 1*a*, without display (507), base (501) and plumbing.

Fluid which exits both the low and high flow pumps passes through check valves 277 and 279 prior to entering tee 255 (ref FIG. 2a). Each check valve prevents the possibility of backflow entering the opposite line, rather than traveling into the inflow manifold.

Fluid enters the inlet manifold through tee 253 (FIG. 2a). Attached to the inlet manifold are temperature sensor 351, and pressure sensor 353. Pressurized fluid will flow into one of two open endcap inlets (601 or 603). Note that only one inlet and one outlet will be open at any given time.

Measured fluid exits the reciprocating piston pump via endcap outlets 605 or 607 and is routed to hydraulic tee 251 where the measured fluid exits the reciprocating piston pump.

7. Linear encoder—The linear encoder is comprised of the encoder sensor board (FIG. 2b, 211), the encoder target (209), the encoder target/magnet housing (207), the encoder base housing (205), the encoder sensor board guide (203), and the encoder housing top (201).

The linear encoder tracks the position of piston assembly P1 (ref. FIG. 5). Magnets 213R and 213L are magnetically coupled to and move in unison with ring magnets 215R and 215L which are a part of piston assembly P1 (FIG. 5). Magnets 213R and 213L are mounted inside of the encoder target/magnet housing (207). Mounted at the end of 207 is the encoder target. As piston assembly P1 moves longitudinally inside of cylinder housing 109, encoder target/magnetic housing 207 moves in unison with it, thus moving the linear encoder target (209) across sensor board 211.

8. Computer and Display—The computer (FIG. 1a, 505) and computer display (FIG. 1a, 507) are housed inside framework 509. The computer displays, computes and stores data associated with input from the user, along with processing position information relayed to it from the linear encoder. It controls when, and in what time duration the PRV (FIG. 3a) will shift positions, allowing the device to function as a batching, dosing, and custody transfer system.

The computer displays diagnostic information, making trouble shooting and maintenance to be performed user friendly.

Device Operation

Fluid enters the device at point A (ref FIG. 1a) and passes through air/fluid valve 293. The reciprocating piston pump can draw fluid into the device through suction created by high flow pump 361 (FIG. 1a), or air/fluid valve 293 can be rotated 180 degrees, and the pump assembly can be gravity fed from the top of the device.

Fluid enters hydraulic tee 257 (ref. FIG. 2a) where the flow of fluid is split between low flow pump 363 and high flow pump 361. A manual flow control valve is provided to the user as well in the form of a bypass line. The bypass begins at tee 261, where a portion of the pressurized fluid will return to the inflow side of pump 361 via tee 261, bypass flow control valve 289 and return tee 259. The majority of the fluid will flow past bypass tee 261, flow through check valve 279 and into tee 255, where it will rejoin fluid from the low flow pump.

The low flow pump provides flow to a small portion of the total fluid entering the reciprocating piston pump. The purpose of the low flow pump is to provide volume flow at rates which are easier to manage. As a volume target is approached, flow from the high flow pump stops, allowing the fluid to move through the device at a much slower rate. When the volumetric target is reached, the PRV valve closes, and the low flow pump stops.

Fluid exists low flow pump 363 (ref. FIG. 2a), travels through check valve 277 and enters tee 255 where it merges with fluid from the high flow pump.

Under pump supplied pressure, fluid enters tee 253 of the intake manifold where the temperature and pressure of the fluid is recorded via temperature sensor 351, and pressure sensor 353 (ref. FIG. 2a). Fluid then enters one of two inflow orifices (601 or 603).

Deaeration valves 451L and 451R are rigidly mounted on each cylinder endcap housing (105R, 105L) and serve to purge the system of air as fluid is initially pumped into the reciprocating piston pump. Once all air is purged from chambers C1 and C2 through deaeration valves 451R and 451L, the valves can be closed, and normal operation can begin.

Figure 7B:
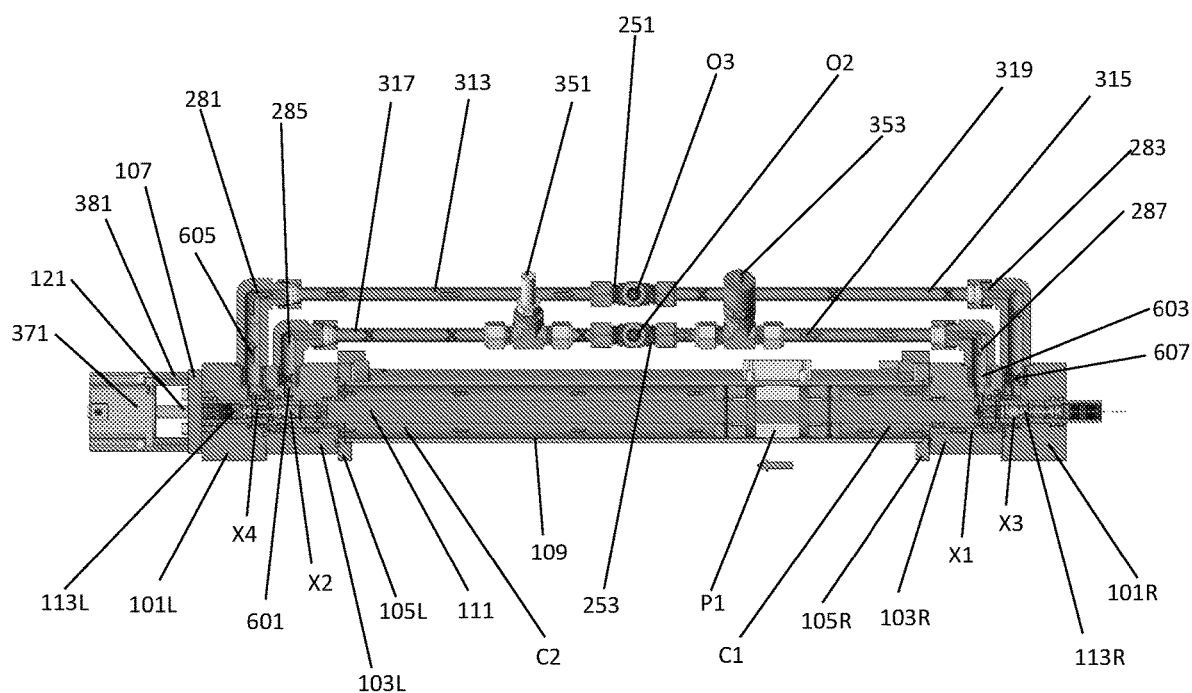
Figure 7C:
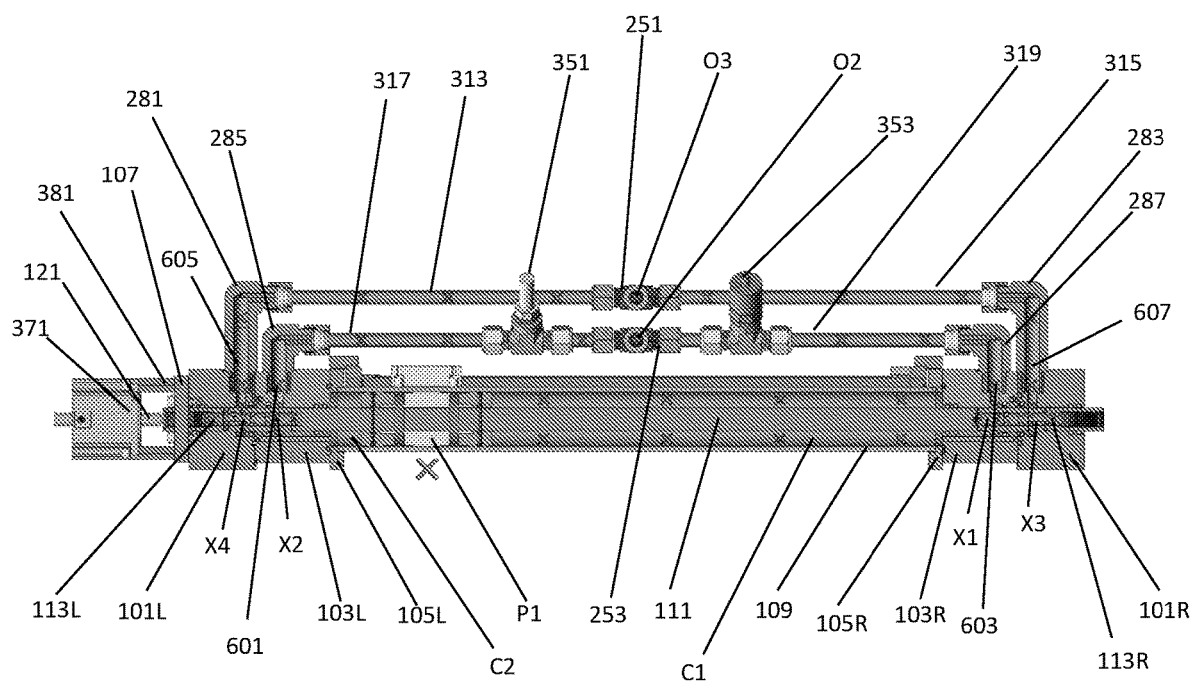
Figure 7D:
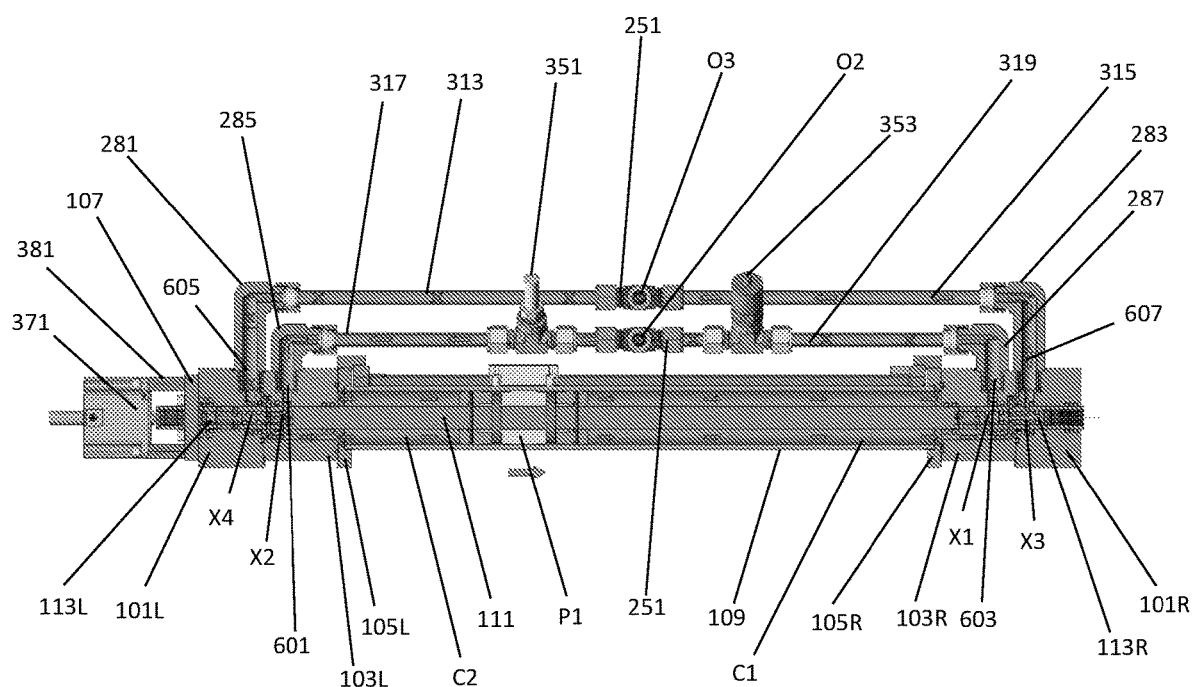
Figure 8A:
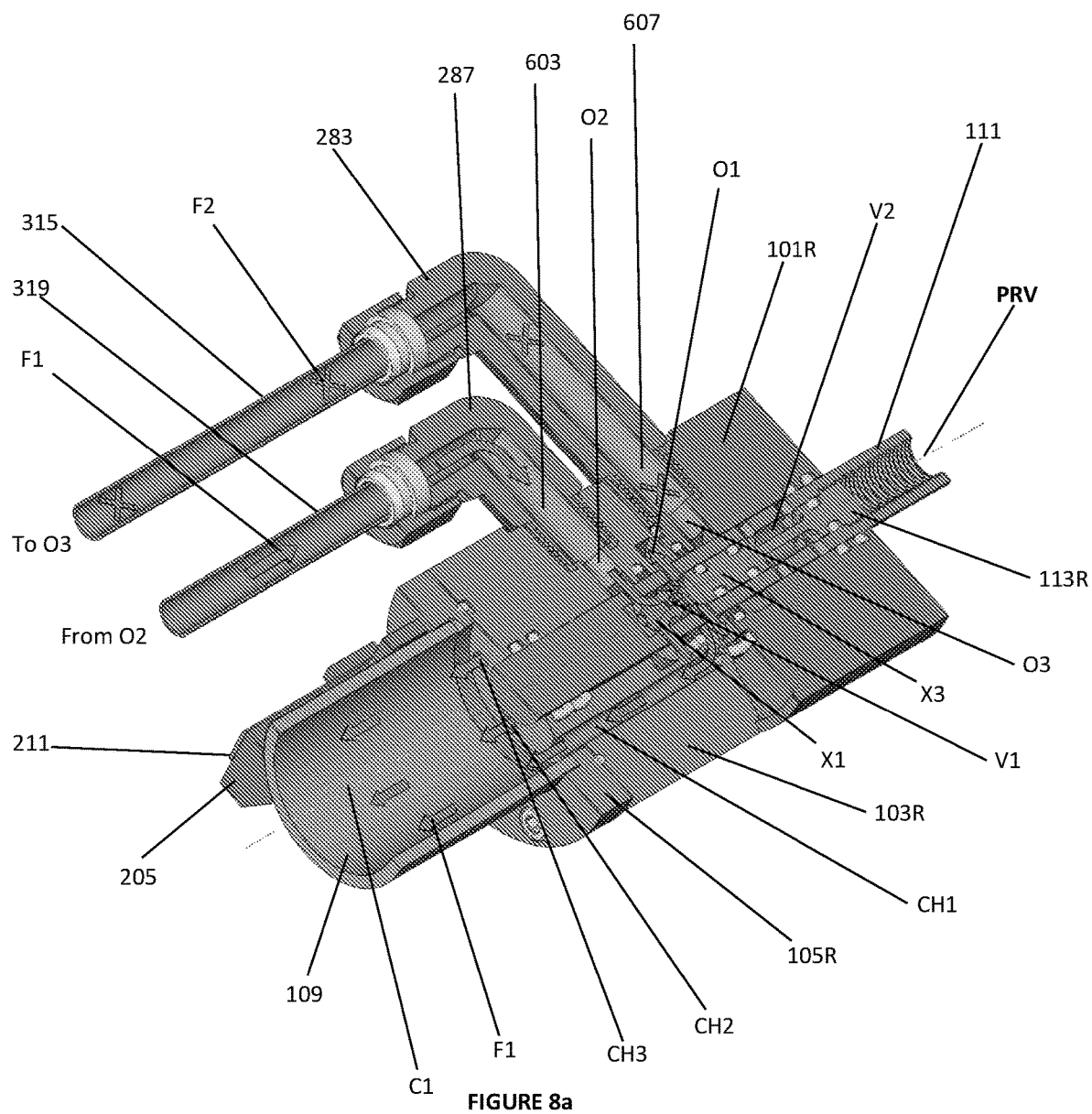
Figure 8B:
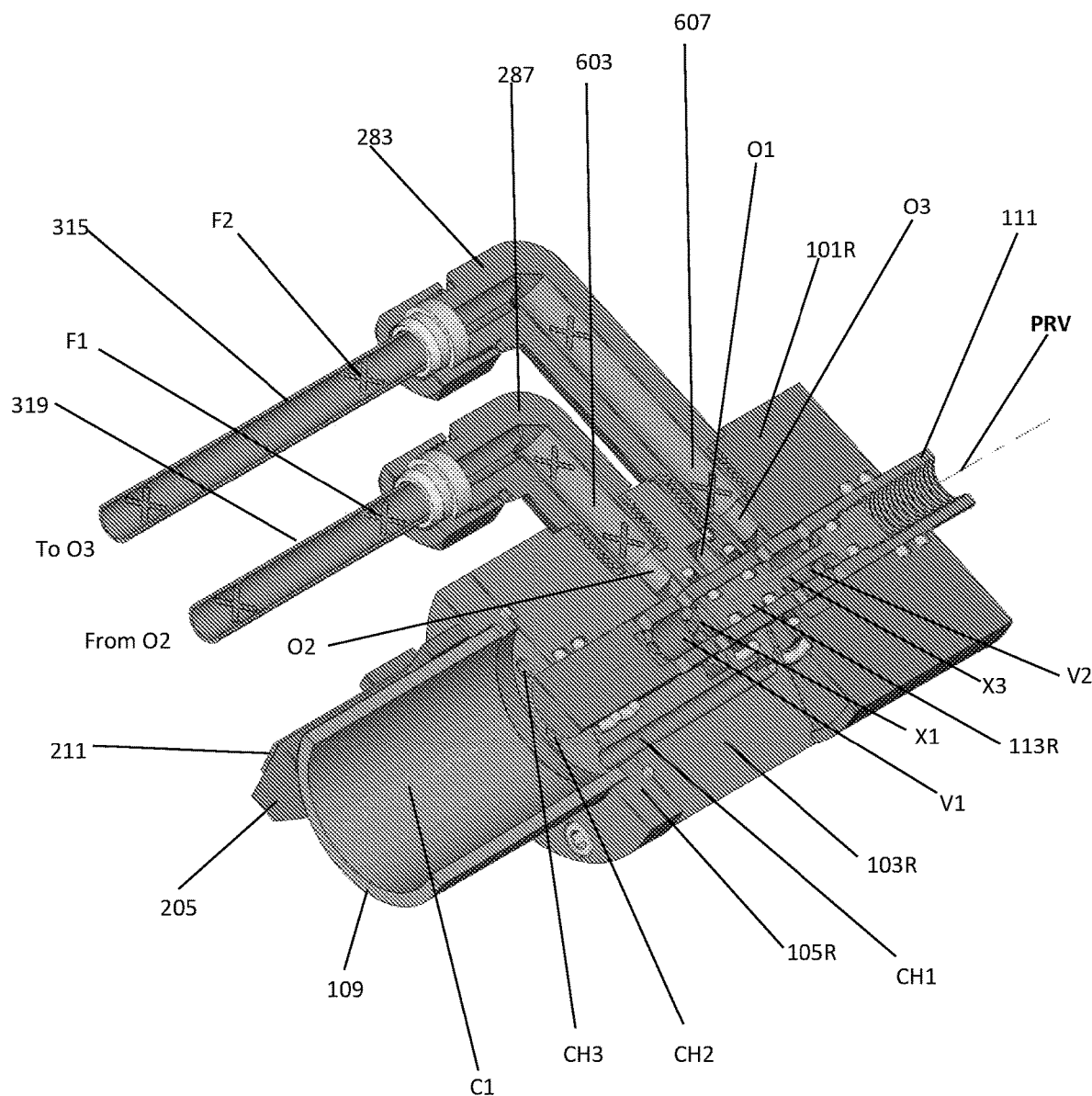
Figure 8C:
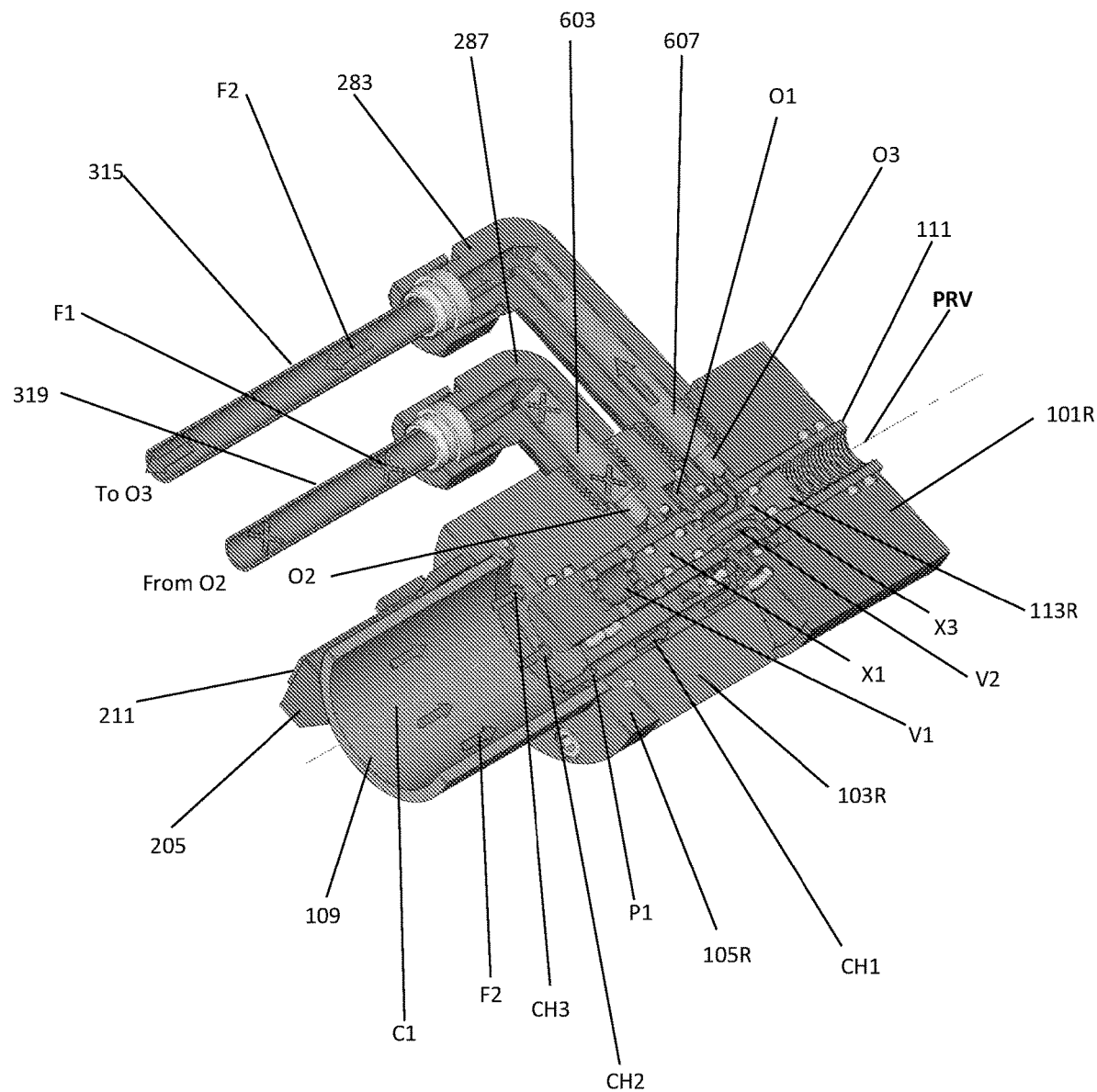

Each endcap contains one inlet and one outlet. Each inlet and each outlet leads to the associated chamber C1 or C2. One passage drains C1 or C2 via the exit manifold, while its counterpart fills C1 or C2. FIGS. 7b, 7c 7d are horizontal cross-sectional views of a reciprocating piston pump of FIG. 1a. FIGS. 8a, 8b and 8c are perspective cross-sectional views of the right endcap assembly of FIG. 1a.

FIGS. 7b, 7c and 7d show piston assembly P1 moving longitudinally inside cylinder housing 109 to the left, reversing direction, and moving to the right, in conjunction with fluid flowing through the pump assembly.

FIG. 7b depicts pushrod valve assembly (FIG. 3a, PRV) in a first position where the first passage X1 between first inlet 603 and chamber C1 is open, the third passage X3 between first chamber C1 and first outlet 607 is closed, the second passage X2 between second inlet 601 and second chamber C2 is closed, the fourth passage X4 between second chamber C2 and second outlet 605 is open. Fluid flows into right chamber C1 through the first passage X1 (comprising inlet 603), pushing piston assembly P1 toward the left. The fluid in the left chamber, C2 exits through the fourth passage X4 (comprising outlet 605). Piston assembly P1 is approaching towards the end of its longitudinal travel length inside of cylinder housing 109.

FIG. 7c depicts piston assembly P1 approaching the end of its travel length, and when the pushrod assembly valve (PRV) will be driven through a second position. In the second position, PRV momentarily stops the flow of fluid moving through the reciprocating piston pump, and stops piston assembly P1 while the PRV moves to its new (third) position. FIG. 7c depicts pushrod valve assembly (FIG. 3a, PRV) in a second position where the first passage X1 between first inlet 603 and chamber C1 is closed, the third passage X3 between first chamber C1 and first outlet 607 is closed, the second passage X2 between second inlet 601 and second chamber C2 is closed, and the fourth passage X4 between second chamber C2 and second outlet 605 is closed.

FIG. 7d depicts pushrod valve assembly (FIG. 3a, PRV) in a third position where the first passage X1 between first inlet 603 and chamber C1 is closed, the third passage X3 between first chamber C1 and first outlet 607 is open, the second passage X2 between second inlet 601 and second chamber C2 is open, and the fourth passage X4 between second chamber C2 and second outlet 605 is closed. Fluid flows into left chamber C2 through the second passage X2 (comprising inlet 601), pushing piston assembly P1 toward the right. The fluid in the right chamber, C1 exits through the fourth passage X4 (comprising outlet 607).

FIG. 8a is a perspective cross-sectional view of the right endcap assembly of FIG. 1a. FIG. 8a depicts pushrod valve assembly (PRV) in a first position where a first passage between first inlet 603 and chamber C1 is open, and a third passage between first chamber C1 and first outlet 607 is closed. Fluid from first inlet 603 enters void V1 inside the pushrod assembly valve through the left set of holes in bank 1 and exits bank 1 through the right set of holes in bank 1 (ref FIG. 3b). Fluid then enters O1 in the center of the right endcap 103R, 101R. O1 intersects with 6 channels (CH1-6) which are fluidly coupled with chamber C1.

FIG. 8b is a perspective cross-sectional view of the right endcap assembly of FIG. 1a. FIG. 8a depicts pushrod valve assembly (PRV) in a second position where a first passage between first inlet 603 and chamber C1 is closed, and a third passage between first chamber C1 and first outlet 607 is closed. Fluid from first inlet 603 is blocked from entering void V1 inside the pushrod assembly. Note the position of O1 is aligned between banks 1 and banks 2 of the pushrod valve assembly, thereby closing all passages between inlets 601, 603 and outlets 605, 607. The full closure of O1 prevents fluid from entering or exiting chamber C1 and assures the reciprocating piston pump is accurate.

FIG. 8c is a perspective cross-sectional view of the right endcap assembly of FIG. 1a. FIG. 8c depicts pushrod valve assembly (PRV) in a third position where a first passage between first inlet 603 and chamber C1 is closed, and a third passage between first chamber C1l and first outlet 607 is open. Fluid from chamber C1 is fluidly coupled with O1 via six channels (CH1-6). Fluid enters CH1-6, flows into O1 and enters the left holes of bank 3 of the pushrod valve assembly. Fluid exits the right holes of bank 3, flows through O3 and enters the exit manifold through a first outlet, 607.

Figure 8D:
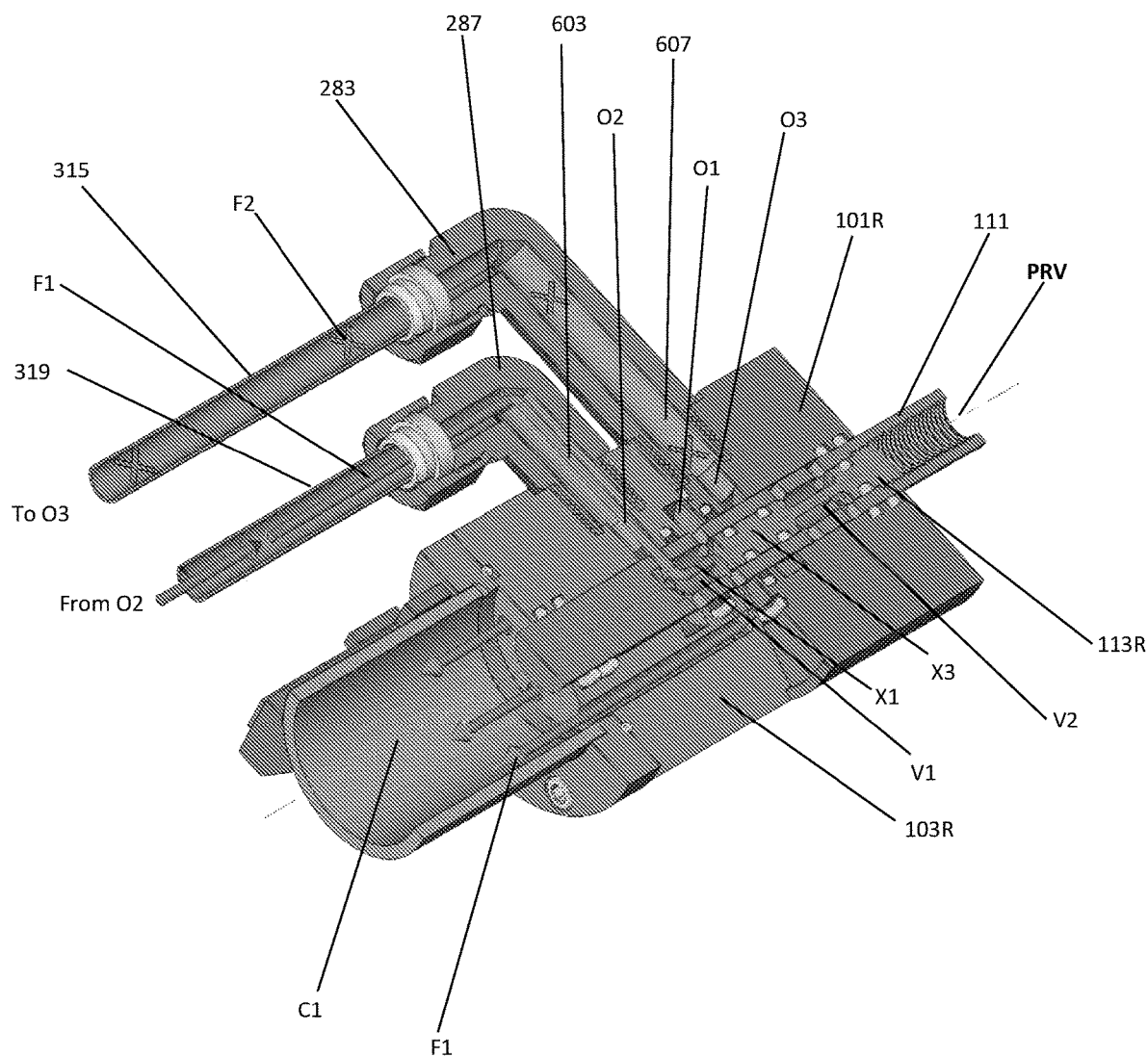

FIG. 8d illustrates a second perspective cross-sectional view of the right endcap assembly of FIG. 1a. FIG. 8d depicts the first passage between first inlet 603 and chamber C1 in an open position. The third passage between first chamber C1 and first outlet 607 is closed.

Figure 8E:
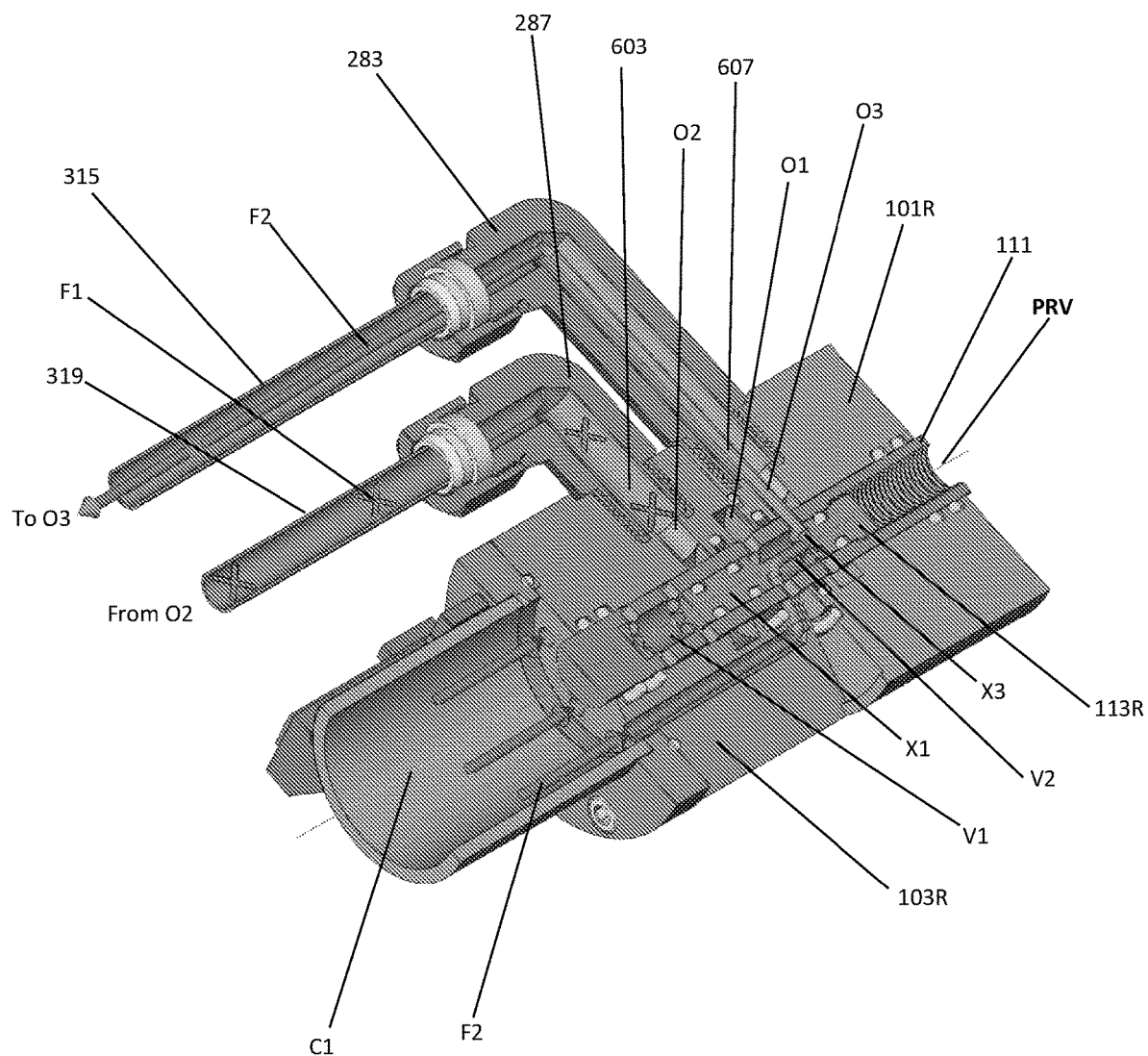

FIG. 8e illustrates a second perspective cross-sectional view of the right endcap assembly of FIG. 1a. FIG. 8d depicts the first passage between first inlet 603 and chamber C1 in a closed position. A third passage between first chamber C1 and first outlet 607 is open.

Fluid exits the device via a first or second outlet (ref FIG. 2a 605, 607). Entering hydraulic elbow 281 or 283, tube 301 or 303, and entering hydraulic tee 251 where the fluid exits the reciprocating piston pump.

A specific volume and/or rate of flow can be specified by the customer through the graphic user interface.

When a specific volume of fluid is requested by the user, the reciprocating piston pump computer (FIG. 1a, 505) will calculate the distance the piston assembly (P1) must travel inside of the cylinder housing (109) to displace the requested volume. When the target distance is approached, the high flow pump will stop, allowing the low flow pump to approach the calculated piston displacement distance at a lower rate of flow. When the target distance is reached, the low flow pump stops, and the PRV may move into a second position (depending on fluid viscosity), closing all inflow and outflow valves at the distance calculated by the reciprocating piston pump computer.

A specific rate of flow can be requested by the user and produced by the reciprocating piston pump. The reciprocating piston pump computer will modulate the highspeed pump RPM until the user specified rate of flow is reached. Once attained, the computer will continue to operate at the calculated RPM until the target volume distance is reached, the pump is automatically or manually turned off, or a new batching cycle begins.

Purging the reciprocating piston pump of fluid requires the use of compressed air. FIG. 1a depicts air/fluid valve 293 and associated air fitting 295.

At the end of a batching or dosing cycle, the reciprocating piston pump will in most cases, require the existing fluid be purged. This process serves to both recover the excess product and clean the inside of the reciprocating piston pump.

The reciprocating piston pump is purged of fluid by attaching a compressed air hose to air fitting 295. Once in place, the air/fluid selector valve is rotated to the air position. Compressed air will move through the reciprocating piston pump along an identical track to that of a fluid flowing through the device. The excess fluid is pumped into a collection vessel where it can be returned to its original container or discarded.

The P1 (ref FIG. 5) piston assembly is comprised of piston endcaps 117R,117L, ring magnets 215R, 215L, piston body center 119, and 4 seals. Seals 475 and 477 are mounted inside internal glands of the P1 assembly which seal the OD of the pushrod assembly (111) against the ID of piston assembly P1. Seals 479 and 481 are mounted inside external glands of the piston assembly which seal the ID of cylinder housing 109 against the OD of piston assembly P1.

FIG. 5 illustrates how ring magnets 215R and 215L, are magnetically coupled with magnets 213R and 213L of encoder target housing 207. When piston assembly P1 is in motion along its longitudinal track inside of cylinder housing 109, encoder target housing 207 physically moves along a longitudinal track identical to that of piston assembly P1. The longitudinal motion of encoder target housing 207 is produced by magnetically coupled ring magnets (215R, 215L) and encoder target housing magnets 213R and 213L. The position of piston assembly P1 is tracked through the motion of target encoder 209's longitudinal motion across linear encoder sensor board 211, which is rigidly attached to linear encoder sensor board base housing 205.

Ring magnets 215R and 215L are physically tracked by linear encoder target 209, which is rigidly fixed to linear encoder housing 207, along with external cylinder magnets 213L and 213R, which are also rigidly mounted to linear encoder housing 207.

When linear encoder target 209 moves longitudinally across linear encoder sensor board 211, positional data, which represents the position of piston assembly P1 is produced and relayed to the reciprocating piston pump computer (FIG. 1a 505).

In an alternative configuration, fluid pressure can be provided by only one high flow geared pump (FIG. 1a, 361). The pump is plumed directly into the pump manifold assembly (ref FIG. 1d). Fluid enters the pump manifold at point A (ref FIG. 1d), where fluid flows through air/fluid valve 293, hydraulic elbow 297, past hydraulic bypass tee 299 and enters high flow pump 365.

Pressurized fluid exits pump 365 and is separated by hydraulic bypass tee 301. A small portion of fluid enters the bypass line via hydraulic bypass tee 301, which is plumed around high flow pump 365 and controlled via bypass valve 289. Bypass fluid is returned to the intake side of high flow pump 365 via return bypass tee 299.

Non-bypass fluid flows past bypass tee 301, through check valve 279 and enters the inflow cylinder manifold through tee 253.

The volumetric accuracy of the primary embodiment, with a low and high flow pump, is superior to the alternate embodiment, with only one high flow pump. The operational characteristics and functions of the alternate embodiment past inflow manifold tee 253 are identical to the primary embodiment.

When a specific volume of fluid is requested by the user, the reciprocating piston pump computer will calculate the distance the piston assembly (P1) must travel inside of the cylinder housing (109) to displace the requested volume. When the target distance is approached, the high flow pump motor will be modulated to a lower RPM by the reciprocating piston pump computer, allowing the piston assembly (P1) to approach the calculated piston displacement distance at a lower rate of flow. When the target distance is reached, the pump stops, and the PRV may move into a second position (depending on fluid viscosity), closing all inflow and outflow valves at the distance calculated by the reciprocating piston pump computer.

A specific rate of flow can be requested by the user and produced by the reciprocating piston pump. The reciprocating piston pump computer will modulate the pump RPM until the user specified rate of flow is reached. Once attained, the computer will continue to operate at the calculated RPM until the target volume distance is reached, the pump is automatically or manually turned off, or a new batching cycle begins.

To summarize the primary embodiment, when piston assembly P1 (ref FIG. 7b) reaches its full length of travel, pushrod assembly (ref PRV FIG. 3a), shifts its position which causes fluid to reverse direction, and in turn, piston assembly P1 also reverses direction. It should be noted that when the pushrod valve assembly passes through a second position, or stops in a second position, that all inflow and outflow ports close, preventing fluid from passing through the reciprocating piston pump without being measured, and stopping the flow of fluid at a specific volume.

The movement of encoder target housing (207), as measured by the linear encoder assembly (ref FIG. 2b 209, 211) is an indication of the volumetric rate of flow through the reciprocating piston pump. Flow rate is determined by tracking the position of piston P1 in conjunction with time (a function of the reciprocating piston pump computer 505 FIG. 1a), as it moves back and forth inside cylinder housing 109.

The alternate embodiment differs from the primary embodiment in that the alternate embodiment implements a single pump, rather than the multiple pumps as seen in the primary embodiment.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

The invention claimed is:

1. A reciprocating piston pump assembly for measuring a flow rate or a volume of a fluid, comprising:
   a housing having first and second chambers;
   first and second endcaps disposed on opposite ends of the housing and enclosing the first and second chambers, respectively;
   a first inlet and a first outlet disposed on the first endcap;
   a second inlet and a second outlet disposed on the second endcap;
   first and second passages that couple the first and second inlets to the first and second chambers via the first and second endcaps, respectively;
   third and fourth passages that couple the first and second outlets to the first and second chambers via the first and second endcaps, respectively;
   a pushrod comprising an elongated member having a first longitudinal bore and a second longitudinal bore disposed in opposite ends of the pushrod, wherein the pushrod is slidably disposed inside the housing and transitionable between a first position, a second position, and a third position;
   a piston coupled with the pushrod and sized and dimensioned to fluidly decouple the first chamber from the second chamber;
   a tracking device that is capable of tracking a position of the piston;
   a first valve comprising first and second pairs of holes disposed on an outer surface of the pushrod that fluidly couple with the first longitudinal bore, wherein the first valve is positioned at a first junction between the first and third passages inside the first endcap;

a second valve comprising first and second pairs of holes disposed on an outer surface of the pushrod that fluidly couple with the second longitudinal bore, wherein the second valve is positioned at a second junction between the second and fourth passages inside the second endcap;

wherein the first and second valves are rigidly coupled with the pushrod and disposed on opposing sides of the piston; and a driver coupled with the pushrod.

2. The reciprocating piston pump assembly of claim 1, further comprising a first sealing member and a second sealing member that are sized and dimensioned to seal a left side and a right side of the pushrod within the housing.

3. The reciprocating piston pump assembly of claim 1, wherein the driver comprises a motor having a shaft, wherein the shaft is rigidly coupled with the pushrod.

4. The reciprocating piston pump assembly of claim 3, wherein the driver is communicatively coupled with a computer.

5. The reciprocating piston pump assembly of claim 4, wherein the computer is communicatively coupled with a linear encoder for monitoring a position of the piston.

6. The reciprocating piston pump assembly of claim 5, wherein the computer is configured to actuate the driver and change a position of the pushrod based on a signal from the linear encoder.

7. The reciprocating piston pump assembly of claim 1, wherein the driver is configured to shift the pushrod between the first position, the second position, and the third position, wherein:

in the first position, the first valve is positioned such that the first chamber is fluidly coupled with the first inlet and fluidly decoupled with the first outlet, and the second valve is positioned such that the second chamber is fluidly coupled with the second outlet and fluidly decoupled with the second inlet; and in the second position, the first chamber is fluidly decoupled from the first inlet and the first outlet, and the second chamber is fluidly decoupled with the second inlet and second outlet; and in the third position, the second valve is positioned such that the second chamber is fluidly coupled with second inlet and fluidly decoupled with the second outlet, and the first valve is positioned such that the first chamber is fluidly coupled with the first outlet and fluidly decoupled with the first inlet.

8. The reciprocating piston pump assembly of claim 1, wherein:

the first pair of holes disposed on an outer surface of the pushrod for each of the first and second valves comprises a first plurality of holes and a second plurality of holes that are fluidly coupled to a first chamber in the first and second longitudinal bores, respectively;

the second pair of holes disposed on an outer surface of the pushrod for each of the first and second valves comprise a first plurality of holes and a second plurality of holes that are fluidly coupled to a second chamber in the first and second longitudinal bores, respectively; and wherein the first chamber is fluidly decoupled from the second chamber in the first and second longitudinal bores.

9. The reciprocating piston pump assembly of claim 8, wherein the first and second chambers in the first and second longitudinal bores are fluidly decoupled by a first pin and a second pin disposed in the first and second longitudinal bores, respectively.

10. The reciprocating piston pump assembly of claim 9, wherein the first and second pin each have a center portion between two end portions, and wherein the center portion has a smaller outer diameter than the end portions.

11. The reciprocating piston pump assembly of claim 1, wherein the piston has at least one magnet and the tracking device has at least one magnet positioned to magnetically couple with the at least one magnet of the piston.

12. The reciprocating piston pump assembly of claim 1, wherein the piston comprises a first piston, a second piston, a first magnet, and a second magnet.

13. The reciprocating piston pump assembly of claim 12, wherein the first and second magnets are disposed between the first and second pistons.

14. The reciprocating piston pump assembly of claim 13, wherein the first and second magnets are separated by a piston body center.

15. The reciprocating piston pump assembly of claim 13, wherein the first and second pistons each have a first seal disposed between an outer diameter of the first and second piston, and an inner diameter of the housing.

16. The reciprocating piston pump assembly of claim 15, wherein the first and second pistons each have a second seal disposed between an inner diameter of the first and second piston, and an outer diameter of the pushrod.

17. The reciprocating piston pump assembly of claim 13, wherein the tracking device comprises a first magnet and a second magnet that are positioned to be magnetically coupled with the first and second magnets in the piston, respectively.

18. The reciprocating piston pump assembly of claim 17, wherein the tracking device further comprises a circuit board and a sensor.

19. The reciprocating piston pump assembly of claim 1, wherein the housing is a cylinder housing.

* * * * *